United States Patent [19]

Pelletier et al.

[11] Patent Number: 5,124,936
[45] Date of Patent: Jun. 23, 1992

[54] METHOD AND APPARATUS FOR MEASURING AIRBORNE URANIUM AND TRANSURANIUM ELEMENTS

[75] Inventors: Charles A. Pelletier, Niantic, Conn.; Daniel DeHaan, San Diego, Calif.

[73] Assignee: Science Applications International Corporation, San Diego, Calif.

[21] Appl. No.: 607,178

[22] Filed: Oct. 31, 1990

[51] Int. Cl.$^5$ .................................................. G01T 1/36
[52] U.S. Cl. ................................... 364/527; 250/370.02
[58] Field of Search ................... 250/370.02, 370.06; 364/527, 498, 555, 574, 572

[56] References Cited

U.S. PATENT DOCUMENTS

| | | | |
|---|---|---|---|
| 4,454,587 | 6/1984 | Keifer et al. | 364/527 |
| 4,607,165 | 8/1986 | Burghoffer et al. | 250/370.02 |
| 4,808,827 | 2/1989 | Woollam | 250/370.02 |
| 4,888,485 | 12/1989 | Becker et al. | 250/370.02 |

*Primary Examiner*—Salvatore Cangialosi
*Attorney, Agent, or Firm*—Fitch, Even, Tabin & Flannery

[57] ABSTRACT

Radioactivity from airborne uranium and transuranium elements is measured by utilizing two independent alpha spectroscopy techniques to subtract background alpha radiation from a gross radiation measurement to provide a net alpha count associated with just the uranium or transuranium elements of interest. An average of the two net alpha counts is computed and used as a measure of the alpha radiation or count of interest. Negative systematic errors appearing in the net alpha counts are minimized by setting any long term negative value of the net alpha count to zero. The first spectroscopy technique divides a measured alpha spectrum into n regions, where n is greater than four, and where the region of interest has the lowest range of alpha particle energies. The background radiation for the region of interest is computed as a function of the gross radiation of each region and a set of scattering functions that relate the number of alpha particles of a higher energy region appearing in a given lower energy region. The second spectroscopy technique divides the alpha spectrum into three regions, with the region of interest being a center region, and the other two regions being end regions on either side thereof. The background radiation is determined by performing an exponential interpolation of the alpha counts measured in the end regions.

21 Claims, 10 Drawing Sheets

METHOD AND APPARATUS FOR MEASURING AIRBORNE URANIUM AND TRANSURANIUM ELEMENTS

BACKGROUND OF THE INVENTION

The present invention relates to radioactivity measuring apparatus and methods. More particularly, the invention relates to methods and apparatus for accurately and reliably measuring airborne uranium and transuranium elements, particularly in the presence of naturally occurring radon and thoron radioactivity.

When handling or working with uranium or transuranic elements (a transuranic element is an element having an atomic number higher than that of uranium, such as plutonium), it is a common occurrence for small uranium or transuranic particles to become airborne. As even small particles of these elements are highly radioactive, it is important to monitor the air in the vicinity of such elements for the presence of uranium or transuranic particles. A high concentration of such particles in the air poses a health hazard if such air is breathed by workers or exhausted to the environment.

Uranium and transuranium elements emit alpha radiation (hereafter called "artificial radioactivity"). Other commonly occurring non-transuranic elements, such as radon and thoron, also emit alpha radiation (hereafter called "natural radioactivity"). Unfortunately, the maximum permissible concentrations of artificial radioactivity in air are very low compared to the concentrations of natural radioactivity already in the air. Thus, in order to measure accurately low concentrations of alpha particles attributable to artificial radioactivity, there is a need to subtract the number of alpha particles attributable to natural radioactivity from the total number of alpha particles present in a sample of air.

Various methods are known in the art for subtracting natural alpha radioactivity from the measurement of artificial radioactivity. One method relies on the fact that the half life of natural radioactivity is shorter than the half life of artificial radioactivity. Apparatus employing such method draws air through a one or two inch diameter filter. The filter medium is in the form of a long strip on a reel. The filter is advanced continuously or periodically so that there is a delay between the time the sample is collected to the time the alpha radiation emitted from the sample is counted. During the delay period, the natural radioactivity decays to a greater extent than does the artificial radioactivity. Hence, when the alpha count is made (after the delay period), a major portion of the alpha count is attributable to just the artificial radioactivity. Disadvantageously, the airborne concentrations thus measured are not made in real time. Hence, if there is an inadvertent release of contaminated air (air containing high levels of artificial radioactivity) to the atmosphere, it is not detected until after the delay period, which may be up to an hour or more. Further, in order to measure very low concentrations of artificial radioactivity, the delay between collecting and counting must be several hours in order to allow the natural radioactivity to decay completely out of the measurement. Such a long delay is unacceptable or impractical in many situations.

Another method known in the art for subtracting natural alpha radioactivity involves an inertial separation. This method assumes that most airborne particles emitting natural radioactivity are lodged on very small particles, while airborne particles emitting artificial radioactivity are lodged on larger particles. An impactor device is therefore used to separate large airborne particles from small airborne particles. The impactor device directs an air stream toward a surface. The air stream is made to change direction by ninety degrees. Larger airborne particles are not able to traverse the ninety degree bend in the air stream and are impinged on a surface at the bend. Smaller particles follow the air stream around the and are exhausted from the impactor device. The surface on which the larger particles are impacted includes the face of an alpha radioactivity detector which has been smeared with a sticky material. The resulting alpha count obtained from the detector is thus based primarily on the larger particles, which is presumed to be the artificial radioactivity. Unfortunately, this presumption is not always true. The particle sizes of artificial radioactivity vary depending upon the way the particles are formed. For mechanically generated particles (e.g., milling, drilling, grinding, etc.), the particle sizes tend to be large. For particles generated by heat or chemical reaction, however, the particle sizes may be much smaller, and in many cases may not be impinged on the detector. Further, in dusty environments, the buildup of dust on the detector absorbs much of the alpha radioactivity, thus lowering the efficiency of the detector. Moreover, the dust buildup on the detector is not uniform (as would be the case for air drawn through a filter), but is impacted over a very small area under each impactor nozzle. Hence, the accuracy of the measurement, particularly over time, is compromised.

Still another method known in the art to subtract natural alpha radioactivity from the measurement of artificial radioactivity involves the simultaneous measurement of alpha and beta radioactivity. This method is premised on the theory that natural radioactivity always includes both an alpha particle and a beta particle, whereas artificial radioactivity includes just an alpha particle. In accordance with this method, a thin window proportional counter is used to count both alpha and beta radioactivity from a fixed filter. Simply stated, if a beta particle is measured in quasi coincidence with an alpha particle, it means that the alpha particle is from natural radioactivity and is subtracted from the gross count. If an alpha particle is counted alone, it means that it was emitted by artificial radioactivity.

There are also several subtraction methods known in the art involving alpha spectroscopy. In accordance with such methods, an alpha spectrum is measured using conventional alpha spectroscopy techniques. Such an alpha spectrum is shown in FIG. 1, and shows the number of alpha particles detected (identified as "relative counts" along the vertical axis) versus the alpha particle energy (shown in units of millions of electron volts, or MeV, along the horizontal axis). The alpha spectrum shown in FIG. 1 is from a filter which has collected dust from the air for 65 hours. In FIG. 1, the 7.68 MeV alpha energy is from a daughter of radon (natural radioactivity). The alpha energy 8.78 MeV is from a daughter of thoron (also natural radioactivity). However, for the reasons set forth below, both thoron and radon daughter products contribute to the 6.0 MeV and lower alpha energies. Hence, if one desires to measure the radioactivity of plutonium-239 (having an energy of 5.2 MeV, and considered as artificial radioactivity), it is not possible to simply measure the 5.2 MeV alpha energy and assume it is all attributable to plutonium-239.

Alpha particles are not very penetrating. A plain piece of paper stops them. Thus, alpha particles cannot travel more than a few inches in air before giving up all energy to air molecules. This property of alpha particles complicates spectroscopy because alpha particles lose energy getting through the dust layer on the filter and the ⅛ to ¼ inch of air between the filter and a detector. This scattering of alpha particles results in an energy-spectrum having broad peaks with tails on the lower energy side of the peak. The tail represents alpha particles which have lost more energy than those in the peak. The tail goes all the way to zero energy.

The energies of alpha particles from the artificial radioactivity of interest are all lower than the energies from natural radioactivity. FIG. 1 shows the position of the peak for plutonium-239 (approximately 5.2 MeV) and uranium-238 (approximately 4 MeV) if they were present in the sample.

Thus, the main problem in alpha spectroscopy is to determine the counting rate of alpha particles from natural radioactivity which have scattered down into the lower energy areas (frequently termed "background" radiation) so that it can be subtracted to determine the net counting rate from artificial radioactivity.

Several techniques are known in the spectroscopic art for subtracting the natural radioactivity scattered into the plutonium or uranium regions of interest. Because the present invention also relies on alpha spectroscopy to measure artificial radioactivity, a brief description of these prior techniques will be presented.

A first alpha spectroscopy method is known as the two region method. In accordance with the tworegion method, the alpha spectrum is divided into two regions, as shown in FIG. 2. One region includes all the counts above the plutonium energy (5.2 MeV). The other region includes all the counts, including the plutonium energy region, below 5.2 MeV. In FIG. 2, these two regions are labelled $G_B$ and $G_b$. Hereafter G is the symbol for gross counts. By sampling in an area without artificial radioactivity, a ratio (R) of $G_b/G_B$ is determined for natural radioactivity, such that:

$$G_b = RG_B \qquad (1)$$

If the sampler is placed in an area where plutonium may be present, $G_B$ is measured and multiplied by R (previously determined) and the product is subtracted from the total activity measured in the artificial radioactivity region of interest ($G_O$). If the result ($N_O$) is significantly greater than zero, artificial radioactivity is assumed to be present. In mathematical terms:

$$N_O = G_O - G_b \qquad (2)$$

where $G_O$ is the total radioactivity in the region of interest and $N_O$ is the net radioactivity in the region of interest.

Because the ratio R is not constant, a modified two-region method has also been used. In the modified two-region method the energy regions $G_B$ and $G_b$ are reduced to only those counts in the 6 MeV peak and those in the plutonium or uranium peaks respectively, as shown in FIG. 3. The procedure for computing the net count due to artificial radioactivity is the same as in Eqs. (1) and (2).

The modified two-region method produces a value of R that is less variable than that produced using the two-region method. However, the ratio R is generally still too variable to detect small differences in concentration in the region of interest.

To improve upon the two-region and modified two-region background subtraction techniques, a method was introduced at Los Alamos National Laboratory known as the four region method. The four-region method divides the energy spectrum into four regions, as shown in FIG. 4. In accordance with the four-region method, it is presumed that the gross alpha particle counts in each of the four regions are related by:

$$G_1/G_2 = K\, G_3/G_4 \qquad (3)$$

where K is a proportionality constant determined empirically by sampling air where only natural radioactivity is present; $G_1$ is the gross alpha count in the first region for natural radioactivity; $G_2$ is the gross alpha count in the second region; $G_3$ is the gross alpha count in the third region; and $G_4$ is the gross alpha count in the fourth region.

When sampling air from an area where artificial radioactivity is present, the following equation is used by the four-region method to compute the net count due to artificial radioactivity:

$$N_O = G_1 - K * G_2 * G_3/G_4 \qquad (4)$$

In Eq. (4), it is noted that the background radiation, $G_b$, is $K * G_2 * G_3/G_4$.

The four-region method provides a marked improvement over the two region methods previously described. However, even the four region method suffers from the fact that K is not constant for all conditions of natural radioactivity. A three-region method has thus been proposed as an alternative. FIG. 5 shows the regions used in the three-region method. Mathematically the counts due to plutonium are expressed as follows:

$$N_O = G_O - [K_1 G_1 + K_2 G_2] \qquad (5)$$

where $K_1$ and $K_2$ are empirically determined by sampling air where only natural radioactivity is present.

Basically, the three-region method uses the counts in regions $G_1$ and $G_2$ to interpolate linearly the background radiation, $G_b$, between them, i.e., $K_1 G_1 + K_2 G_2 = G_b$.

Disadvantageously, all of the above-described alpha spectroscopy methods suffer from one or more drawbacks.

First, the methods assume that the shape of the energy spectrum of each alpha particle is constant. In fact, the resolution of the alpha particle energies changes constantly. When a filter is new, the resolution tends to be poor, i.e., the alpha energy peaks are broad and tend to scatter more into the lower regions. This is most likely due to initial penetration of the filter paper by small dust particles carrying the naturally radioactive atoms. The alpha particles emitted by the radioactive atoms lose energy by interacting with filter material. As sampling goes on, the resolution tends to improve. The most likely explanation for the improved resolution is that the collected dust prohibits penetration of other dust particles into the filter. The result is less loss of energy getting to the detector and better resolution. FIGS. 1, 2 and 3 show the spectrum of a filter which had been used to collect dust for 65 hours. In contrast, FIGS. 4 and 5 show the spectrum of a filter which has been used to collect dust for only 12 hours. The 12 hour filter provides a much poorer resolution because the scattering of the alpha particles to the lower energies is much greater than with the 65 hour filter.

In addition to this rather slow change from poorer to better resolution, there also appears to be random changes over shorter time periods. This is believed to be due to the position of the radioactive atom in relation to the dust particle to which it is attached. If an alpha particle has to travel through its carrier dust particle to get to the detector, for example, it will lose more energy than if it is on the side of the particle facing the detector. Particle size distributions also change with time. This would also change the shape of the alpha spectrum. The bigger the dust particle, the poorer the resolution.

Another problem associated with alpha spectroscopy is illustrated in FIG. 6. FIG. 6 shows the alpha spectrum of a filter which had only been used to collect dust for nine hours. The resolution is much better than with the 12 hour collection. In fact, the resolution of the 7.68 MeV peak is almost as good as the 65 hour filter. However, the resolution of the 6 MeV peak is poorer. This illustrates another complicating factor. The resolution of the three naturally occurring alpha peaks is not necessarily the same, nor does there appear to be a constant relationship among them. They appear to act independently.

The first three methods (two-region, modified two-region, and four-region) assume that the relative amounts of the three alpha energies of natural radioactivity stay constant with time. In fact, because of their different half lives, the relative proportions of the peaks change with time. At the beginning of a sampling period, a first 6 MeV peak with a 3 minute half life predominates. Within a few hours, the 7.68 MeV peak predominates because it has a 28 minute half life. For filters left to collect dust for days, the 8.78 MeV peak and a second 6.0 MeV peak begin to dominate the spectrum because their half life is approximately 10 hours. In addition to these trends, short term variations also take place depending on local conditions such as ventilation exhaust rates, atmospheric conditions, etc.

The last method (three region) assumes linearity. In fact, however, the leading edge of the energy spectrum is exponential.

In view of the above, it is evident that what is needed is an improved alpha spectroscopy method of subtracting natural alpha radioactivity from the measurement of artificial radioactivity that does not assume a constant shape of the energy spectrum, thereby providing good resolution independent of time, i.e., providing just as good a resolution at 20 minutes as is obtained at one hour or at 65 hours. Further, it is evident that a method is needed that does not incorrectly assume that the relative amounts of the alpha energies stay constant with time or that the leading edge of the energy spectrum is linear. The present invention advantageously addresses these and other needs.

SUMMARY OF THE INVENTION

In accordance with one aspect of the invention, there is provided an improved method for accurately measuring radioactivity from airborne uranium and transuranium elements. The method utilizes two independent alpha spectroscopy techniques to determine and subtract background alpha radiation from a gross radiation measurement, thereby providing a net alpha count associated with just the uranium or transuranium elements of interest. The two net alpha counts are then averaged in order to provide a more accurate measure of the alpha radiation of interest than is provided by either method alone.

In accordance with another aspect of the invention, negative systematic errors appearing in the average net alpha count are eliminated by monitoring the average alpha count and by setting any negative value to zero.

In accordance with still another aspect of the invention, air monitoring apparatus is provided for continuously monitoring air for the presence of uranium or transuranium elements. The apparatus includes a chassis assembly in which suitable processing means are housed for carrying out the method of the invention. Coupled to the chassis assembly are means for detecting alpha radioactivity in a sample of air. A control panel forms part of the chassis assembly and allows a desired radiation threshold to be set. In the event the detected radiation in the air sample exceeds the threshold, an audible and/or visual alarm signal is generated. The chassis assembly further includes a display for displaying the net alpha count measured.

The first spectroscopy technique of the two independent techniques used by the present invention divides a measured alpha spectrum into n regions, where n is an integer greater than four, e.g. seven, and where the region of interest has the lowest range of alpha energies of all the n regions. The background radiation for the region of interest is determined as a function of the gross radiation of each region and a set of scattering functions. The scattering functions are empirically determined and relate how many alpha particles of a higher energy region appear in a given lower energy region.

The second spectroscopy technique of the two independent techniques used by the present invention divides the alpha spectrum into three regions, with the region of interest being a center region, and the other two regions being end regions on either side of the center region. The background radiation in the center region is determined by interpolating the alpha counts measured in the end regions, assuming an exponential increase from the low energy end region to the high energy end region.

In performing the method of the present invention, the first two regions used with the first spectroscopy technique may advantageously double as the middle and upper end regions, respectively, of the second spectroscopy technique. Hence, in a preferred embodiment, the combination of both techniques can be performed using the same alpha spectrum by dividing the alpha spectrum into eight regions, denominated regions $R_{-1}$, $R_0$, $R_1$, $R_2$, $R_3$, $R_4$, $R_5$, and $R_6$, where region $R_0$ is the region of interest (i.e., the region where an alpha count of artificial radioactivity is to be made), and where each region includes alpha energies of increasingly higher magnitude.

As thus denominated, and as explained more fully below, the method of the present invention determines a net alpha count for the region of interest from the basic relationship shown above in Eq. (2). The background radiation, $G_b$, for the first spectroscopy technique is determined from a gross alpha count from regions $R_1$ through $R_6$, as well as a set of scattering functions. The background radiation, $G'_b$, for the second spectroscopy technique is determined from an exponential interpolation of the gross alpha counts from regions $R_{-1}$ and $R_1$.

One embodiment of the invention may thus be characterized as a method of measuring radioactivity of airborne uranium and transuranium elements. Such method includes a first step of spectroscopically measuring emitted alpha particles from a sample of air to produce an alpha spectrum. This alpha spectrum provides a measure of the relative number of alpha particles within the air sample as a function of alpha particle energy. A second step comprises dividing the alpha spectrum into n regions. Such regions may be denominated, for example, as regions $R_0, R_1, R_2, \ldots R_n$, where n is an integer greater than four. A first region $R_0$ of the n regions corresponds to alpha particles from uranium and transuranium elements. The regions $R_1$ through $R_n$ correspond to regions having higher energies than region $R_0$.

A third step of the method comprises determining a gross alpha particle count in each of the n regions. (A gross count comprises the total number of alpha particles having a detected energy within the energy range of the respective region at the time the spectroscopic measurement is made.) A fourth step then comprises calculating a first net alpha particle count $N_0$ for the first region, i.e., for region $R_0$. The value of this first net count is a function of the gross alpha particle counts determined in the third step and a set of scattering fractions. The set of scattering fractions are empirically determined and provide an indication of how many alpha counts in a given region are attributable to an alpha particle originally having a higher energy than that of the given region. The first net count thus determined provides a first measure of the radioactivity of airborne uranium and transuranium elements within the air sample.

In a preferred embodiment, this four-step method is further enhanced by performing a fifth step of further defining end regions on either side of the region of interest. These regions may be denominated $R_{-1}$, $R_0$, and $R'_1$, where $R_{-1}$ and $R'_1$ are the end regions of lower and higher energies, respectively, on either side of the region of interest, $R_0$. The region $R'_1$ may be the same as the region $R_1$ determined in the second step. A sixth step then involves calculating a second net alpha particle count $N'_0$ for the region $R_0$ by exponentially interpolating between a gross alpha particle count in region $R_{-1}$ and the gross alpha particle count in region $R'_1$. The second net count thus determined provides a second measure of the radioactivity of airborne uranium and transuranium elements within the air sample. The two net alpha particle counts $N_0$ and $N'_0$ are then averaged in a seventh step to provide a third measure of the radioactivity of airborne uranium and transuranium elements within the air sample.

Preferably, the method also includes monitoring the average net alpha particle count in order to correct for any negative systematic errors that may be present therein.

A further embodiment of the invention may be characterized as a monitoring apparatus for continuously monitoring air for the presence of uranium and transuranium elements. Such apparatus includes: (1) a chassis assembly containing processing means for controlling the operation of the monitoring apparatus; (2) a head assembly coupled to the processing means, this head assembly including detector means for detecting alpha particles present in a sample of air; (3) a mass flowmeter coupled or built-in to the processing means and head assembly for defining the sample of air; and (4) alarm means for generating a perceptible alarm in response to an alarm signal generated by the processing means, the alarm signal being generated only when the processing means has determined that the presence of uranium and transuranium elements in the sample of air exceeds a prescribed threshold. The processing means include means for carrying out the method of the invention as described herein.

It is a feature of the present invention to provide an alpha radioactivity measurement method and apparatus that avoids the drawbacks of prior art methods and apparatus.

It is an additional feature of the invention to provide a method and apparatus for alpha spectroscopy that meets the stringent sensitivity requirements of governmental agencies, such as the requirements imposed by the Department of Energy (DOE ORDER 5480.11, Radiation Protection For Occupational Workers, Effective 1-189). In particular, it is a feature of the invention to provide an alpha spectroscopy method and apparatus that during continuous operation produces a very low false alarm rate, which alarm rate may be settable by a user of the apparatus to a desired value, and may be as low as less than once a year. In order to meet such stringent requirements, it is a feature of the invention not to over subtract for natural radioactivity, which over subtraction would reduce sensitivity, and not to under subtract for natural background, which under subtraction would cause false alarms.

It is another feature of the invention to provide a method and apparatus for measuring airborne alpha radioactivity that is reliable in performance, inexpensive to manufacture and operate (compared with prior art methods and apparatus), and easy to operate (i.e., not prone to operator error).

It is yet another feature of the invention to provide an improved alpha spectroscopy subtraction method that does not assume a constant shape of the energy spectrum. Thus, the resolution obtained from a given measurement is not dependent on when the measurement is made, e.g., after 1 hour or 65 hours, as are prior art devices.

It is still an additional feature of the invention to provide such measurement apparatus and method, in accordance with a preferred embodiment, wherein two independent processing techniques are used to measure the net alpha radioactivity in a region of interest, with the results being averaged to provide a measurement reading. Further, it is a feature of the invention that in carrying out the processing techniques of the invention, no incorrect assumptions are made as to the relationship between adjacent portions of the energy spectrum.

It is a further feature of the invention to provide easy-to-use portable apparatus that continuously monitors the air for airborne contaminants, that immediately sounds an audible alarm (or other detectable alarm) in real time if the detected level of contaminants in the air exceed a prescribed threshold, and that allows the prescribed threshold to be adjusted or set to a desired level.

BRIEF DESCRIPTION OF THE DRAWINGS

The above and other aspects, features and advantages of the present invention will be more apparent from the following more particular description thereof, presented in conjunction with the following drawings wherein.

DETAILED DESCRIPTION OF THE INVENTION

The following description is of the best mode presently contemplated for carrying out the invention. This description is not to be taken in a limiting sense, but is made merely for the purpose of describing the general principles of the invention. The scope of the invention should be determined with reference to the claims.

The method of the invention will be described first. The method comprises an alpha spectroscopy method, and as such it is first required to measure sufficient radiation within a sample of air (e.g., over a sufficient period of time) to generate an alpha spectrum. Conventional means may be used for this purpose.

Figure 1:
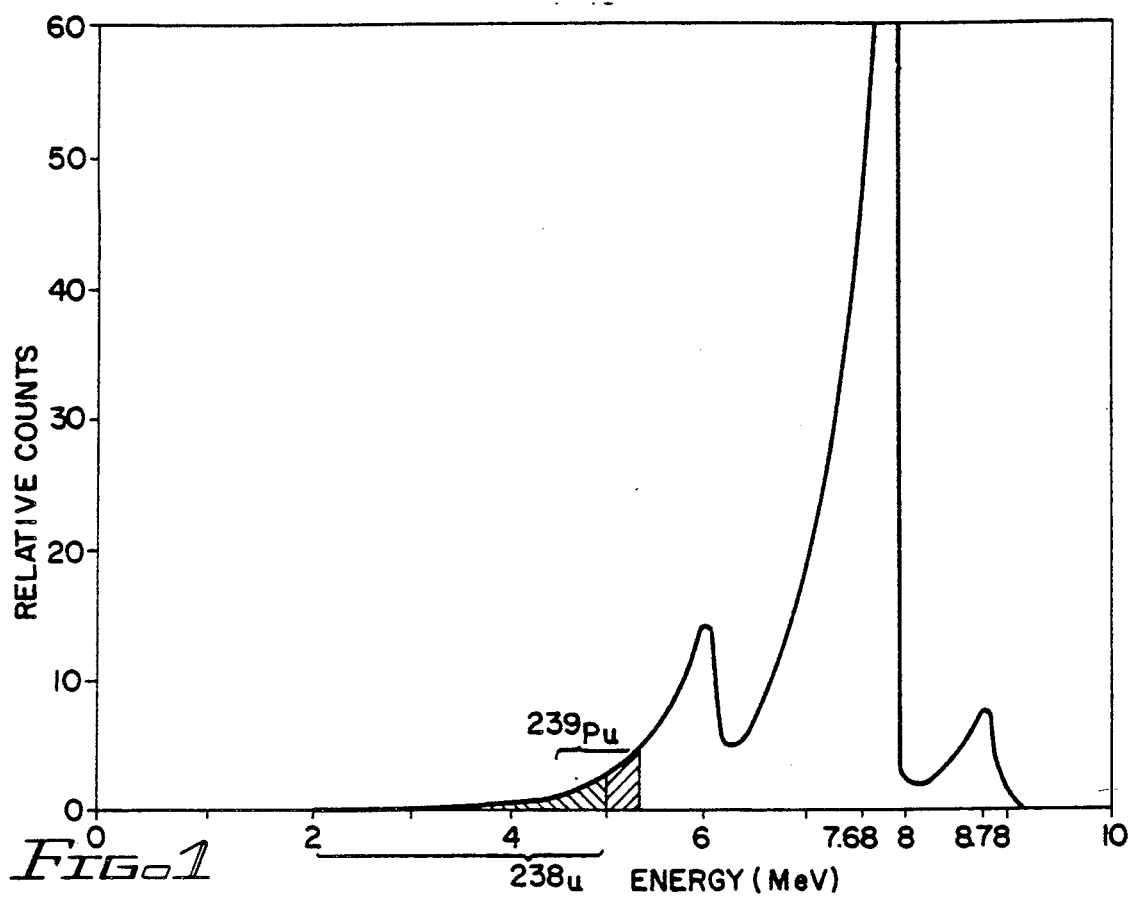
FIGS. 1-6 are various alpha spectrums, and are described above in connection with some of the alpha spectroscopy techniques known in the art for subtracting natural radiation from radioactivity measurements.
Figure 2:
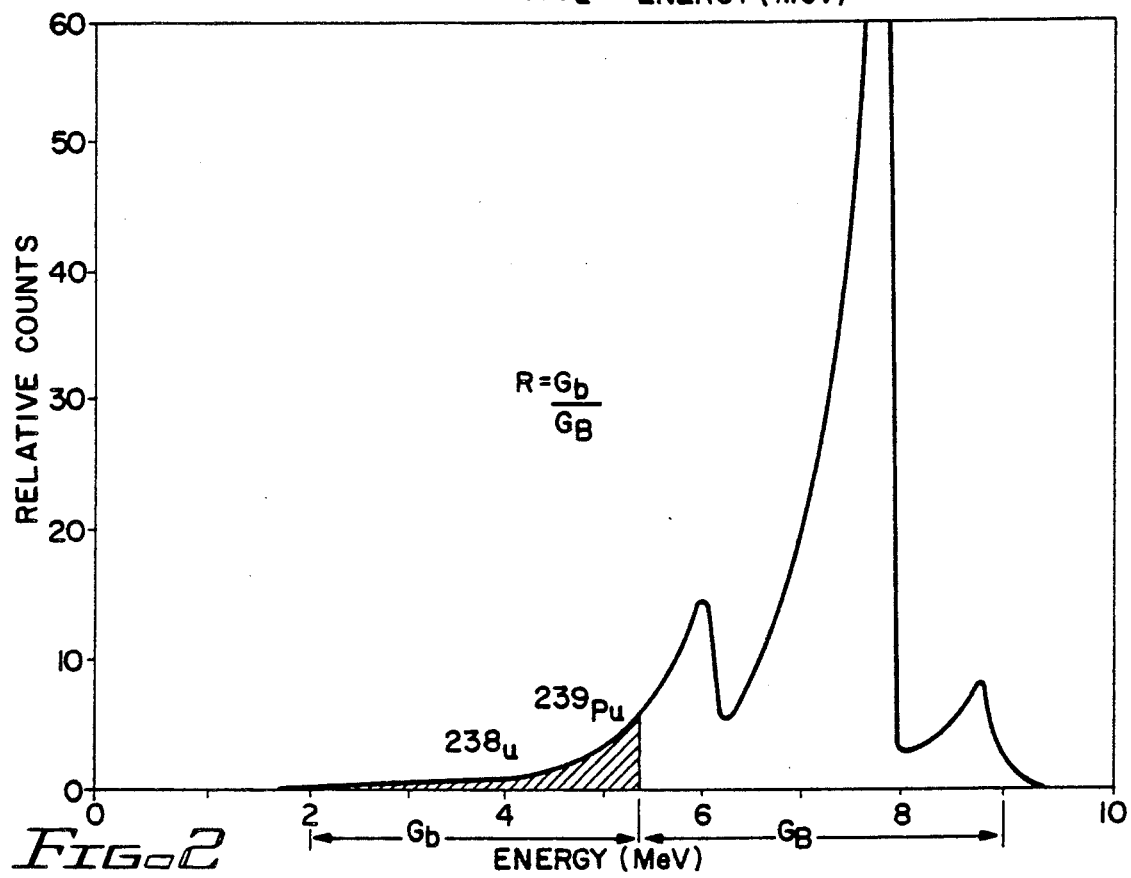
Figure 3:
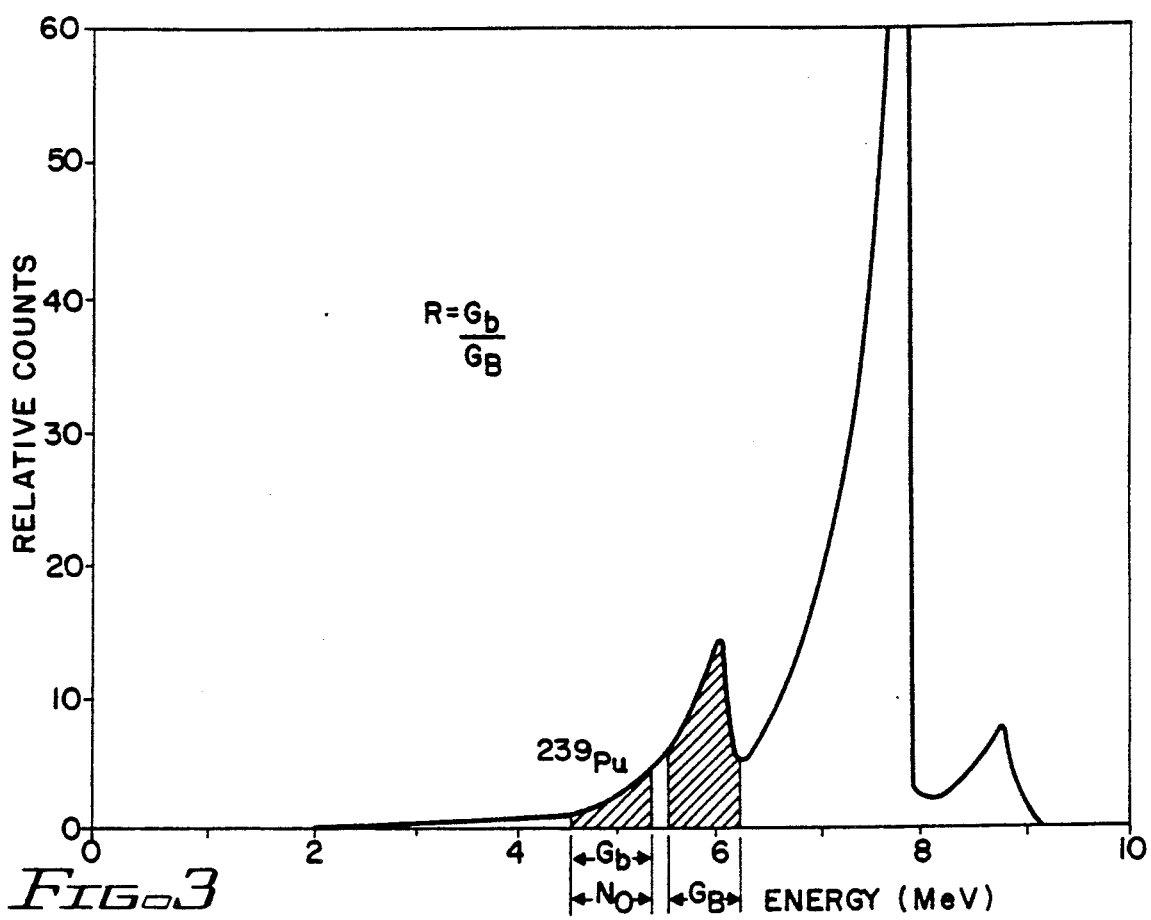
Figure 4:
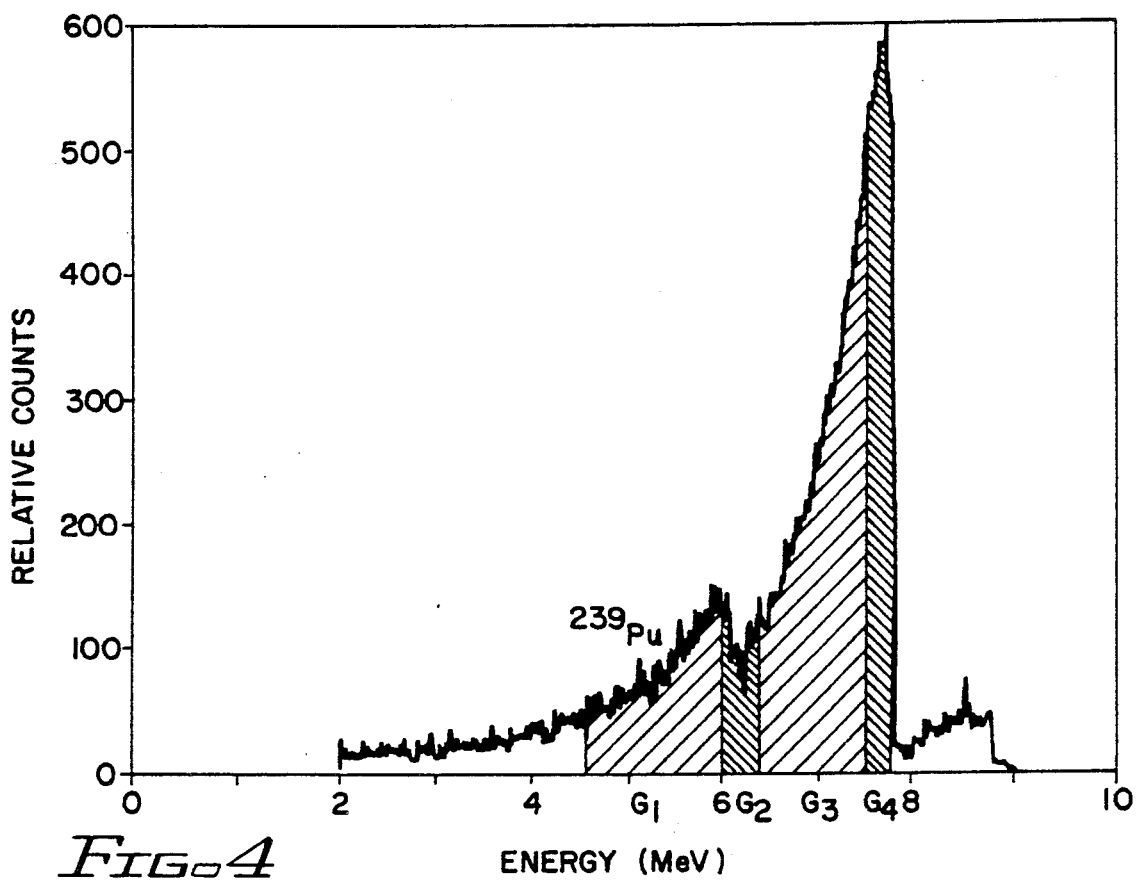
Figure 5:
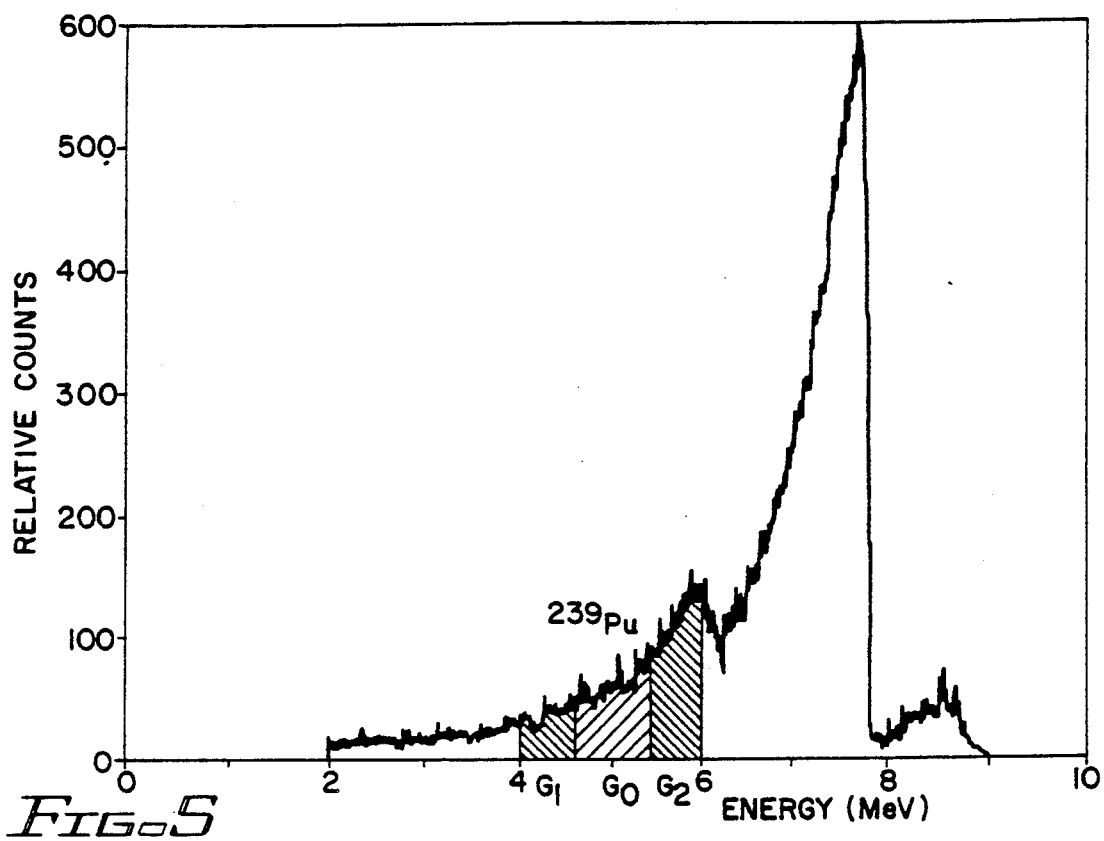
Figure 6:
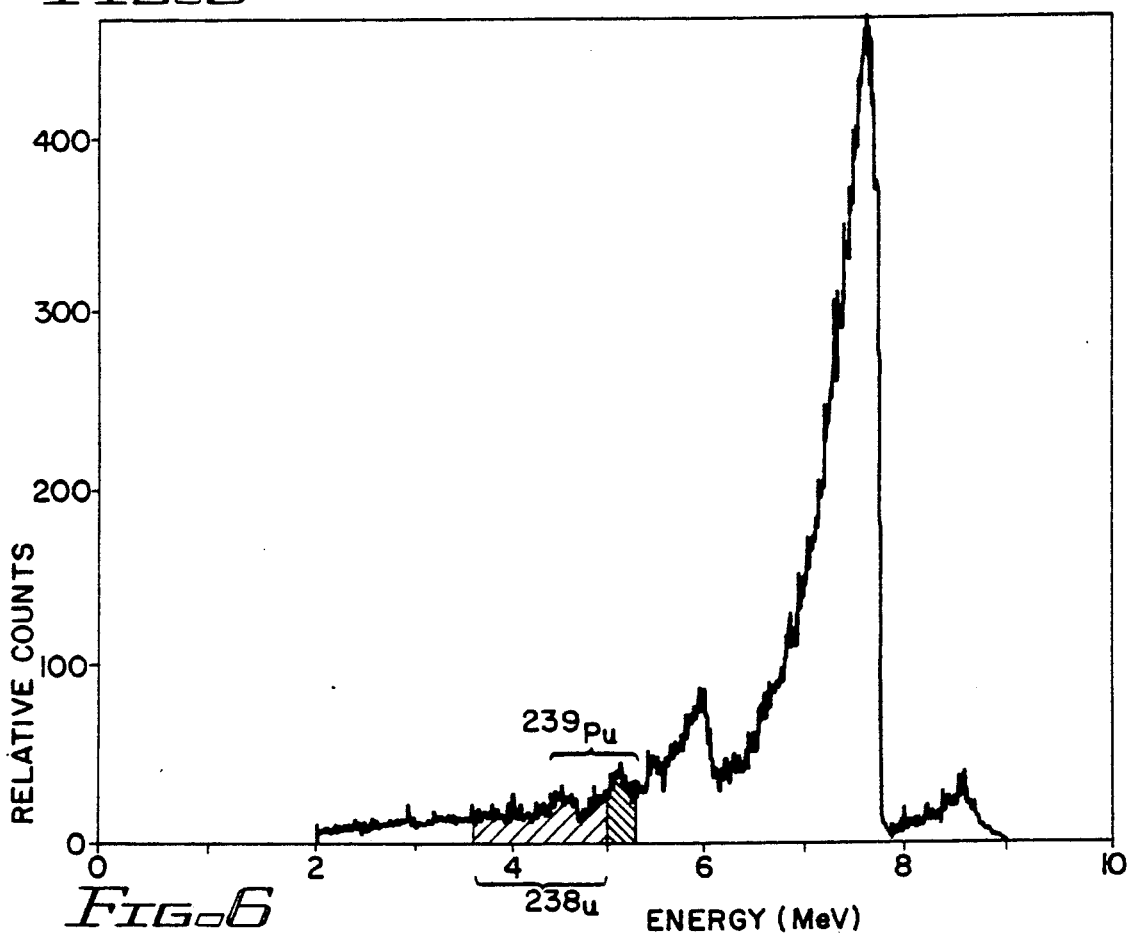
Figure 7:
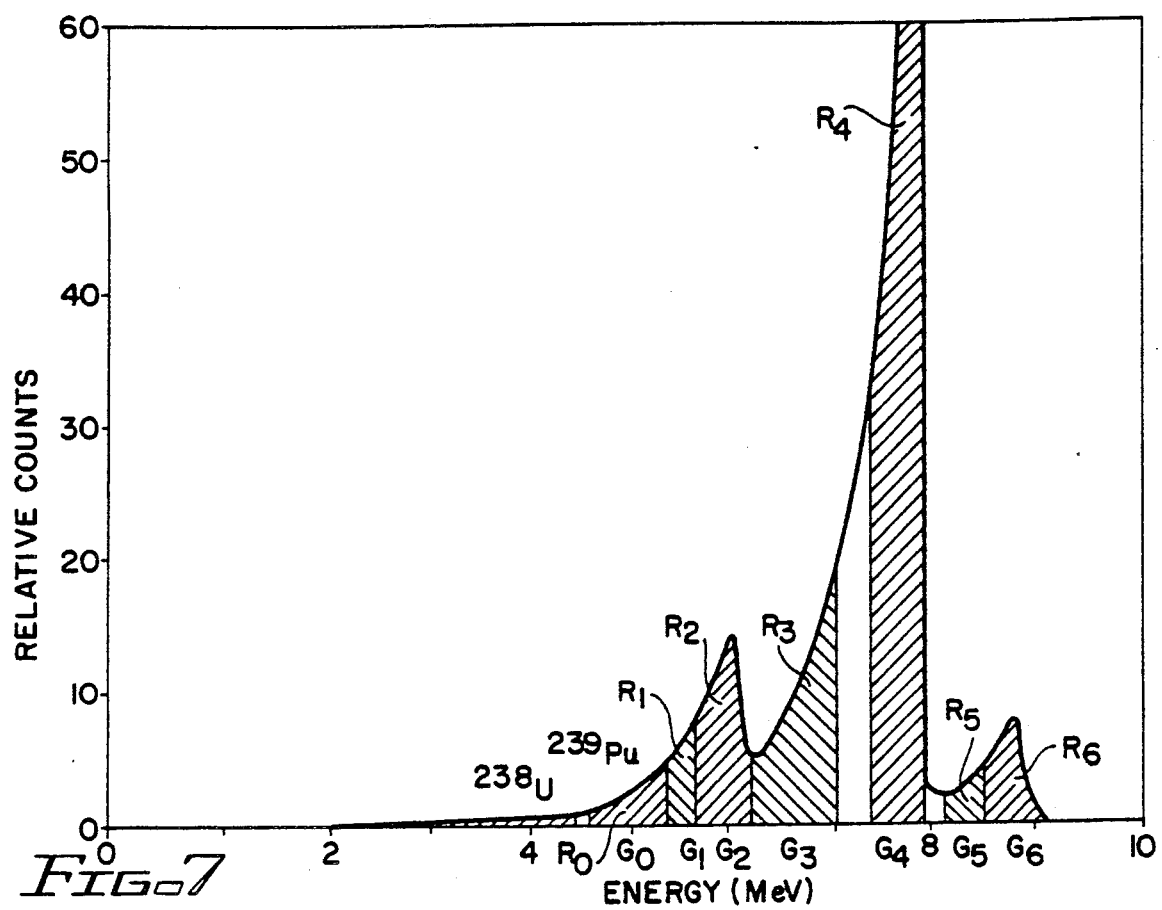
FIG. 7 is an alpha spectrum illustrating the various regions used with a first subtraction method of the present invention.
Figure 8:
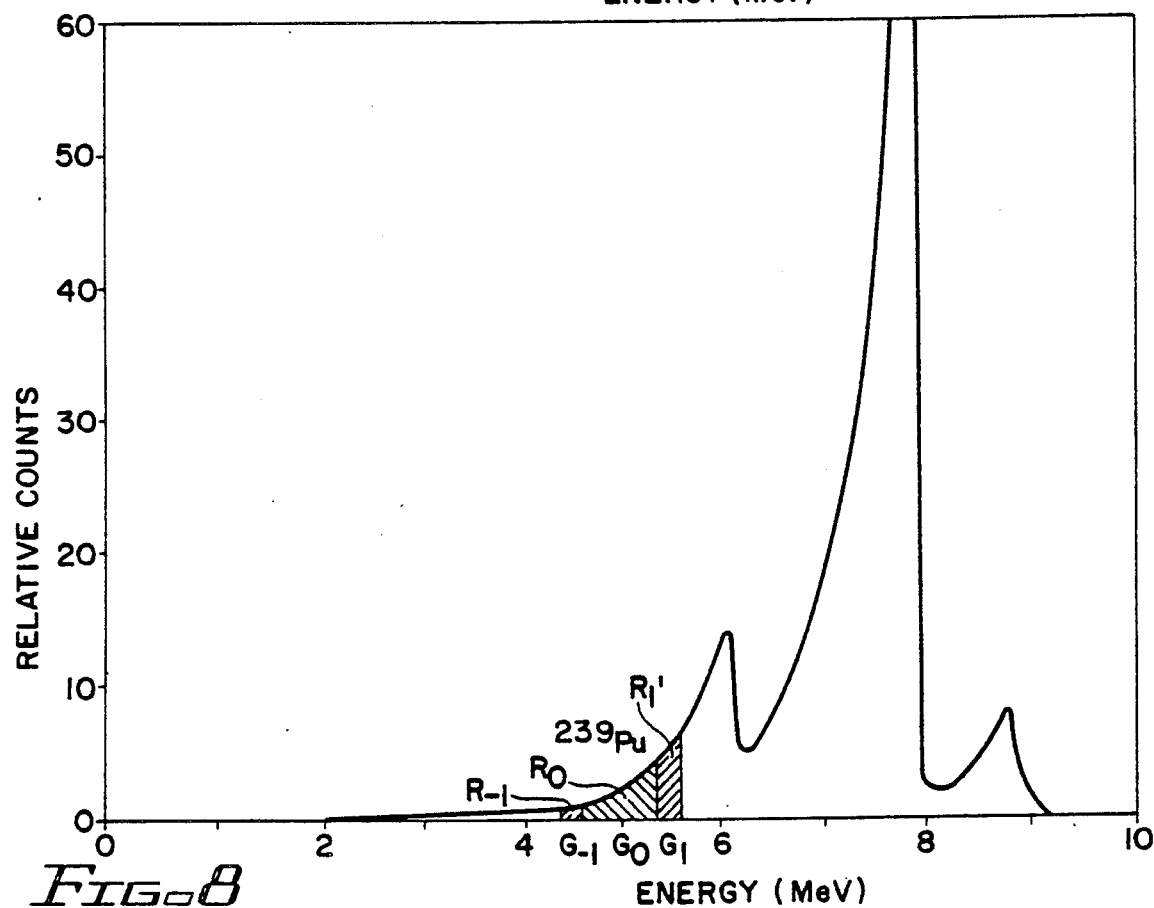
FIG. 8 is also an alpha spectrum illustrating some additional spectral regions used with a second subtraction method of the present invention.

Once the alpha spectrum has been obtained, the method of the present invention divides the spectrum into a maximum of nine regions. FIG. 7 shows seven of these regions, denominated $R_0$, $R_1$, $R_2$, $R_3$, $R_4$, $R_5$, $R_6$, where $R_0$ is the region of interest. FIG. 8 shows the remaining two regions, denominated $R_{-1}$ and $R'_1$, one of each side of the region of interest $R_0$. As seen in FIGS. 7 and 8, it is preferred that the region $R_1$ in FIG. 7 be approximately the same size, as region $R'_1$ in FIG. 8. When this is the case, the method of the invention thus requires dividing the spectrum into eight regions, regions $R_{-1}$, $R_0$, $R_1$, $R_2$, $R_3$, $R_4$, $R_5$, and $R_6$. However, it is to be understood that the region $R'_1$ may be somewhat different in FIG. 8 than it is in FIG. 7, e.g., in order to provide symmetry about the region $R_0$, in which case there would be nine spectral regions involved with the method of the present invention, regions $R_{-1}$, $R_0$, $R_1$, $R'_1$, $R_2$, $R_3$, $R_4$, $R_5$, and $R_6$.

The gross alpha particle count from each region is represented herein by $G_i$, where i is the region from which the gross count is obtained. Thus, $G_{-1}$ represents the gross count measured from region $R_{-1}$, $G_0$ represents the gross count obtained from region $R_0$, $G_1$ represents the gross count obtained from region $R_1$, and so on. As indicated above, this gross count may be measured using any conventional means. The method of the present invention concerns itself not so much in how the gross count is measured, but in how the gross count data is processed once it has been obtained.

Basically, all alpha spectroscopy is based on Eq. (2), repeated here for convenience.

$$N_0 = G_0 - G_b \tag{2}$$

where $N_0$ is the net count in the region of interest, $G_0$ is the gross count in the region of interest, and $G_b$ is the background count in the region of interest.

The smaller the uncertainty in the measurements of $G_0$ and $G_b$, the smaller the difference $N_0$ which can be detected. The uncertainty in $G_0$ is known. It is random and follows the Poisson distribution. This is the distribution that all radioactive decay follows. The standard deviation of $G_0$ is equal to the square root of the total number of counts recorded over a period of time.

There are two uncertainties in $G_b$. One is random and, like the error associated with $G_0$, follows the Poisson distribution. The other uncertainty is systematic and is introduced by the method used to determine $G_b$. The systematic error can be either positive or negative. Mathematically the overall uncertainty of $N_0$ is expressed as $$N_0 \pm S \pm e_b = (G_0 \pm S_0) - (G_0 0 \pm S_b \pm E_b) \tag{6}$$

where $$S_0 = \text{Standard deviation on } G_0 = \sqrt{G_0}, \tag{7}$$

$$S_b = \text{Standard deviation on } G_b = \sqrt{G_b}, \tag{8}$$

$$S = \text{Standard deviation on } N_0 = \sqrt{G_b + G_0}, \text{ and} \tag{9}$$

$e_b$ = Systematic error in the computation of background.

As is well known in the art, the objective in alpha monitoring by spectroscopy is to minimize S and $e_b$. As seen in Eq. (9), the random error S is controlled by the values of $G_b$ and $G_0$. The relative random error ($R_b$) associated with $G_b$ may be expressed as $$R_b = \sqrt{G_b}/G_b = 1/\sqrt{G_b}. \tag{10}$$

Similarly, the relative random error ($R_0$) associated with $G_0$ is expressed as $$R_0 = 1/\sqrt{G_0}. \tag{11}$$

The relative random error is expressed as a fraction or a percentage. In both Eqs. (10) and (11), the relative error decreases as the number of counts increases. In practice, this means that the longer the counting time, the smaller the relative error on $G_0$ and $G_b$, and the smaller the relative error on the difference $N_0$. That this is so is evident from the following expressions:

Let $G_0$, $G_b$ and $N_e$ be equal to $g_0t$, $g_bt$ and $n_0t$ respectively, where $g_o$, $g_b$ and $n_0$ are counting rates, and $t$ = counting time. The relative error $R_n$ may then be expressed as $$R_n = \frac{\sqrt{g_0t + g_bt}}{n_0t}. \tag{12}$$

From Eq. (2), it is seen that $G_0 = N_0 + G_b$. Hence, $$g_0t = n_0t + g_bt \tag{13}$$

Thus, substituting Eq. (13) into Eq. (12), it is seen that the relative error may be expressed as $$R_n = \frac{\sqrt{n_0t + 2g_bt}}{n_0t} \tag{14}$$

or $$R_n = \sqrt{\frac{1}{n_0t} + \frac{2g_b}{n_0t}}. \tag{15}$$

Equation (15) shows that the relative error on the difference between $G_0$ and $G_b$ decreases as the square root of the counting time. If it were not for the systematic error ($e_b$) associated with the background subtraction, measuring ever smaller counting rates from artificial radioactivity ($n_0$) would just be a matter of increasing the counting time (t). Furthermore, if the only uncertainty were random (i.e., $e_b$ is zero), one could define with confidence the minimum detectable concentration of artificial radioactivity given all the other parameters which go into the measurement, such as sampling rate, counting efficiency, allowable false alarm rate, etc.

However, the systematic error ($e_b$) is not zero. In practice, the techniques described in the prior art lead to systematic errors which are equivalent to the random error for averaging times of a few minutes. In order to achieve the minimum detectable levels currently being mandated by governmental agencies such as the Department of Energy (DOE), it is necessary to use measurement times of at least 10 minutes.

Thus, it is evident that a method is needed to reduce the systematic error so that it is much less than the random error associated with counting times of 10 minutes or more. The method of the present invention advantageously accomplishes this objective. The method takes into account the continuously changing resolution of each of the three alpha peaks from natural radioactivity. Further, two independent techniques are used to calculate the background from natural radioactivity. The independent results are then averaged to determine $G_b$. Moreover, the method includes a technique for removing the negative systematic error ($-e_b$) from the value of $G_b$. The overall result is a method that lowers the positive systematic error ($+e_b$) to a level which permits averaging times (t) up to at least 12 minutes.

As indicated, the present invention utilizes two independent methods or techniques for determining the background radiation so that it can be subtracted from the gross radiation count. The first technique used to determine the background radiation involves dividing the alpha spectrum into seven regions, as shown in FIG. 7. A set of simultaneous equations are set up to describe the scattering from the higher alpha energies to the lower energies. These equations are as follows:

$$N_0 = G_0 - F_{20}N_2 - F_{40}N_4 - F_{60}N_6 \tag{16}$$

where $N_0$ = Net count in the region of interest for artificial radioactivity (region $R_0$);
$G_0$ = Gross counts in region $R_0$;
$N_2$ = Net count in the 6.0 MeV natural radioactivity region, $R_2$;
$F_{20}$ = Scattering fraction from region $R_2$ to region $R_0$;
$N_4$ = Net count in the 7.68 MeV natural radioactivity region, $R_4$;
$F_{40}$ = Scattering fraction from region $R_4$ to region $R_0$;
$N_6$ = Net count in the 8.78 MeV natural radioactivity region, $R_6$;
$F_{60}$ = Scattering fraction from region $R_6$ to region $R_0$.

$$N_2 = G_2 - F_{42}N_4 - F_{62}N_6 \tag{17}$$

where:

$G_2$ = Gross count in the region $R_2$;
$F_{42}$ = Scattering fraction from region $R_4$ to region $R_2$;
$F_{62}$ = Scattering fraction from region $R_6$ to region $R_2$.

$$N_4 = G_4 - F_{64}N_6 \tag{18}$$

where:

$G_4$ = Gross count in region $R_4$;
$F_{64}$ = Scattering fraction from region $R_6$ to region $R_4$.

$$N_6 = G_6 \tag{19}$$

where $G_6$ = Gross count in region $R_6$.

Values of $G_0$, $G_2$, $G_4$, and $G_6$ are field measured. Scattering coefficients are empirically measured in the laboratory using sources of radon and thoron. The method of the invention involves solving Eqs. (16)–(19) for $N_0$.

As mentioned previously, resolution, and therefore the scattering fractions $F_{ik}$, are not constant. To account for these differences in scattering, the present invention continuously measures resolution and adjusts the scattering coefficients as a function of the measured resolution. The resolution of each peak is measured as shown in Eqs. (20)–(24).

$$\text{Resolution of region } R_2 = N_1/N_2 = S_2 \tag{20}$$

$$\text{Resolution of region } R_4 = N_3/N_4 = S_4 \tag{21}$$

$$\text{Resolution of region } R_6 = G/G_6 = S_6 \tag{22}$$

where:

$$N_3 = G_3 - F_{63}G_6 \tag{23}$$

and $$N_1 = G_1 - F_{41}N_4 \tag{24}$$

Thus, in practicing the method of the present invention, the gross count $G_i$ for each region is obtained Then Eqs. (17), (18), (19), (23) and (24) are used to calculate the N values used in Eqs. (20) and (21) to compute resolution ratios. It is noted that for the purpose of computing $R_2$ the $N_6$ contribution to $N_1$ is negligible.

The scattering coefficients or fractions are empirically determined as a function of the resolution ratio by exposing filters with varying layers of dust to radon and thoron daughter products. The relation between the scattering factors ($F_{ik}$) and the resolution ratio ($S_i$) may be approximated by a linear equation. The equation is of the form:

$$F_{ik} = AS_i + B \qquad (25)$$

Values of A and B are determined for each combination of filter type and size, detector size, and filter to detector distance, as well as any method used for enhancing resolution. For a detector with a surface area of 1700 mm$^2$, a Millipore Corp. SM-5 membrane filter with an active area of 1420 mm$^2$, and a detector o filter distance of 0.2 inches, the values of A and B shown in Table 1 have been measured for the plutonium-239 region of interest (region $R_0$).

TABLE 1

| F | A | B | S Range |
|---|---|---|---|
| $F_{20}$ | 1.93 | −0.157 | $S_2 \geq 0.0813$ |
| $F_{40}$ | 0.194 | −0.0317 | $S_4 \geq 0.38$ |
| $F_{40}$ | 0.151 | −0.0156 | $0.38 < S_4 \leq .103$ |
| $F_{41}$ | 0.0986 | −0.0105 | $S_4 \geq 0.107$ |
| $F_{42}$ | 0.347 | −0.0309 | $S_4 \geq 0.089$ |
| $F_{60}$ | 0.157 | −0.0367 | $S_6 \geq 0.234$ |
| $F_{62}$ | 0.190 | −0.0316 | $S_6 \geq 0.166$ |
| $F_{63}$ | 0.485 | −0.0712 | $S_6 \geq 0.147$ |
| $F_{64}$ | 0.937 | −0.0644 | $S_6 \geq 0.0687$ |

Figure 9:
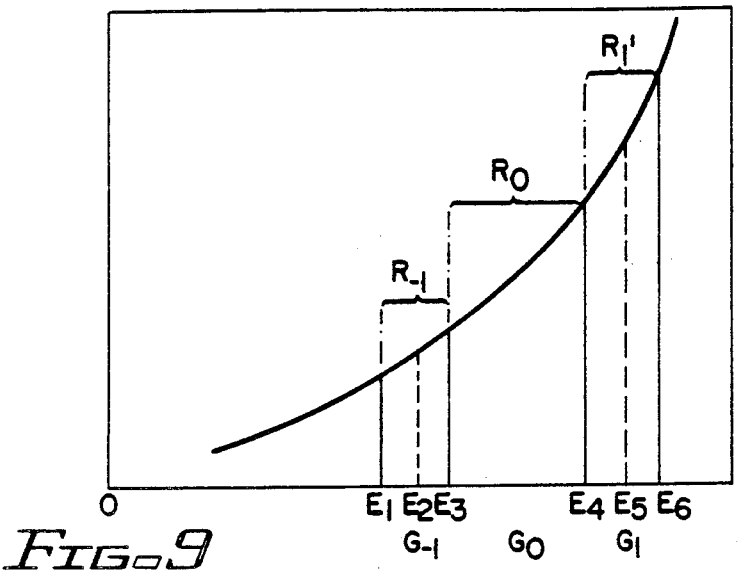
FIG. 9 schematically defines the spectral region boundaries and midpoints used with the second subtraction method described in conjunction with FIG. 8.

The second technique used to determine background radiation applicable to measurements of plutonium-239 utilizes three regions, $R_{-1}$, $R_0$, and $R'_1$, as shown in FIG. 8. This technique interpolates to determine the counts in region $R_0$ using the counts in the adjacent regions $R_{-1}$ and $R'_1$. FIG. 9 shows the details of this technique, and defines the nomenclature used in the following mathematical description of the technique. Note that the lower and upper boundaries of region $R_{-1}$ are identified as $E_1$ and $E_3$, respectively. Similarly, the lower and upper boundaries of region $R'_1$ are identified as $E_4$ and $E_3$, respectively. $E_2$ and $E_5$ are the average energies in regions $R_{-1}$ and $R'_1$, respectively. Mathematically, the second technique calculates the background counts $G'_b$ in region $R_0$ as follows:

$$G'_b = \frac{B}{S}(e^{sE_4} - e^{sE_3}) \qquad (26)$$

In Eq. (26), S and B have the following values:

$$S = \frac{[\ln G_1/(E_6 - E_4) - \ln G_{-1}/(E_3 - E_1)]}{(E_5 - E_2)} \qquad (27)$$

$$B = (G_1/E_6 - E_4)/e^{sE_5} \qquad (28)$$

In Eqs. (27) and (28), $G_{-1}$ and $G_1$ are the gross counts in regions $R_{-1}$ and $R'_1$, respectively. Once the background radiation $G'_b$ in region $R_0$ has been determined from Eq. (26), the net count in region $R_0$ (the region of interest), $N'_0$, is computed as:

$$i\ N'_0 = G_0 - G'_b \qquad (29)$$

The net count derived from the first technique is designated as $N_0$ (see Eq. (16)). The net count derived from the second technique is designated as $N'_0$ (see Eq. (29)). The overall net count in the region of interest, $N_A$, is the average of $N_0$ and $N'_0$. Values of $N_0$ and $N'_0$ are computed at short discrete time intervals, e.g., 6 seconds, and the average $N_A$ is the average of $N_0$ and $N_0'$ over the same interval.

Figure 10:
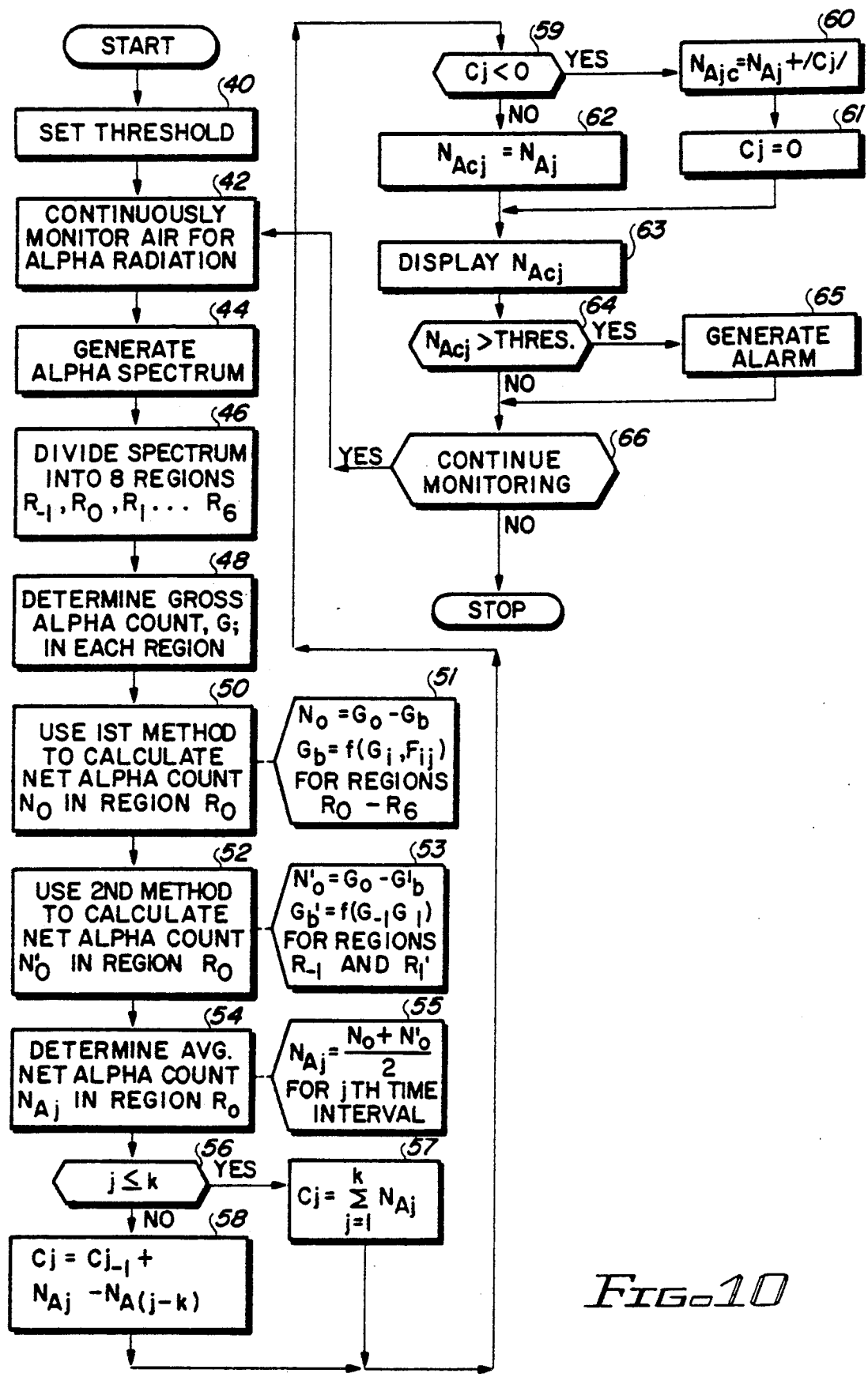
FIG. 10 is a flow chart depicting a preferred method of the present invention for accurately measuring artificial radiation.

Referring next to FIG. 10, the method of the invention thus far described is depicted in flow chart form. When the method is initiated, a threshold value is set to a desired level. This threshold value defines how much artificial alpha radiation can be detected before an alarm is triggered. Setting the threshold value is shown at block 40 of the flow chart. (A "block" of the flow chart is that portion of the flow chart where an indicated step or function is carried out, and is usually set forth in a rectangular or other shaped box.)

Once the threshold has been set, the method continuously monitors an air sample for alpha radiation, as shown in the flow chart at block 42. This continuous monitoring may be carried out using any suitable apparatus configured to detect alpha radiation and the energy of the detected radiation. In a preferred embodiment, the apparatus is as described below in FIGS. 11-14, and accompanying text.

Based on the detected alpha radiation, an alpha spectrum is generated (block 44). In accordance with the preferred method of the invention, this spectrum is then divided into at least eight regions (block 46), designated as regions $R_{-1}$, $R_0$, $R_1$, $R_2$, $R_3$, $R_4$, $R_5$, and R, in order of increasing energy. The region $R_0$ is the region of interest. Once the alpha spectrum is generated, the gross count $G_i$ in each region is determined (block 48). Typically, as the alpha spectral data is gathered, it is classified according to energy. Thus, in the processing apparatus there is a counter (or equivalent) assigned to region $R_{-1}$ that is incremented each time that an alpha particle is detected having an energy falling within the bounds of region $R_{-1}$. Similarly, other counters (or equivalent) are assigned to the other regions, and each is incremented each time an alpha particle is detected having an energy within the range of the assigned spectral region. At any given time, the count held in the counter provides a measure of the gross count, $G_i$, for the region $R_i$.

With a value of the gross count $G_i$ known for the various regions, the first technique described above is then used to determine the net alpha particle count, $N_0$ for region $R_0$ (block 50). This technique computes $N_0$ (block 51) by subtracting the background count, $G_b$, from the gross count, $G_0$, for region $R_0$ where the background count, $G_b$ is a function of the gross count of the higher energy regions and the scattering coefficients or factors, $F_{ik}$, as set forth above in Eqs. (16), (17), (18), (19), (23) and (24).

After $N_0$ has been determined using the first technique, the second technique, described above in connection with Eqs. (26), (27), (28) and (29) is used to determine the net alpha count $N'_0$ (block 52). This determination is based on estimating the background radiation $G'_b$ in region $R_0$ from an interpolation of the gross counts in regions $R_{-1}$ and $R'_1$ (block 53), assuming an exponential increase of the background radiation from region $R_{-1}$ to region $R'_1$.

Once both $N_0$ and $N'_0$ have been determined, an average alpha count, $N_{Aj}$, is computed for the jth time interval starting from the time a fresh filter is first installed within the apparatus. Thus, an average alpha count $N_{A1}$ corresponds to a first time interval subsequent to installation of a new filter, a count $N_{A2}$ corresponds to a second time interval subsequent to installation of a new filter, and so on (block 54).

Once the average $N_A$ has been determined, it is corrected for negative bias if necessary (blocks 56-62). Negative bias may also be referred to as negative systematic error. The only explanation for negative radioactivity is that the background correction is too large. The problem is to distinguish between random error, which can also result in too large a background correction and is a legitimate error, from a systematic error resulting from a less than perfect method of estimating background correction. Therefore, in an environment with the potential for artificial airborne radioactivity, the only acceptable status for long term average net counts in the region of interest is positive or zero. The method described herein corrects for negative bias by setting the long term average to zero if it is negative. No correction is made if the long term average is positive or zero.

To understand better the method of reducing negative systematic error, let $N_{Aj}$ be the net average count for the jth sampling interval, e.g., the jth six second interval. $N_{Aj}$ can be zero, negative or positive, but when added to many subsequent values of $N_{Aj}$, the result should tend to be zero if no artificial radioactivity is on the filter, or positive if artificial radioactivity is on the filter. The preferred integration time used by the method of the present invention is 60 minutes. Assuming a sampling interval of 6 seconds, there will thus be 600 values of $N_{Aj}$ that are added during the integration time. If the sum of these 600 values of $N_{Aj}$ is negative, this sum is "corrected" (set to zero) by adding the absolute value of the negative value to the current value of $N_{Aj}$. This correction (C) is accomplished as explained below.

The correction (C) is defined as:

$$C_j = \sum_{j=1}^{K} N_{Aj} \quad (30)$$

where K is the number of net counts used in summing. Thus, if t=6 seconds, then K=600 means that summing occurs over 3600 seconds, or 60 minutes.

After the first 60 minutes of sampling (i.e., j>k), the correction $C_j$ becomes $$C_j = C_{j-1} + N_{Aj} - N_{A(j-k)} \quad (31)$$

so that the current value or $C_j$ is determined by only the last K samples, e.g., the samples obtained over the last hour.

In accordance with the correction method of the invention, when $C_j$ is negative, its absolute value is added to the current value of $N_{Aj}$. The corrected average net count ($N_{ACj}$) may then be expressed as:

$$N_{ACj} = N_{Aj} + |C_j|$$

One method of performing this correction process is illustrated in the flow chart of FIG. 10. In FIG. 10, it is assumed that a net alpha count is determined at regular time intervals j. Thus, as at block 55, a value of $N_{Aj}$ is determined for the jth time interval. Depending on whether this sampling occurs within the first hour (i.e., if j≦k), determined at block 56, the value of $N_{Aj}$ is added to the previous values at blocks 57 or 58. A determination is then made as to whether the updated value of $C_j$ is less than zero (block 59). If so, then $N_{Aj}$ for that particular time interval is corrected by adding to it the absolute value of $C_j$ (block 60). This corrected value is $N_{ACj}$. The sum $C_j$ is then set equal to zero (block 61). If $C_j$ is positive or zero, the corrected value $N_{ACj}$ is set equal to the value of $N_{Aj}$ (block 62). In either event, the bias corrected value of $N_{ACj}$ is displayed (block 63) and then is tested to determine whether it exceeds a preset threshold (block 64). If so, an alarm signal is generated (block 65). If monitoring is to continue (block 66), then the method repeats, continuing to measure gross alpha counts and determining new values of $N_0$ and $N'_0$ and determines updated values of $N_A$.

It is to be noted that other correction techniques may also be used in addition to or in place of the one described. Any technique which effectively tends to set a negative average of $N_0$ and $N'_0$, or $N_{Aj}$, to zero at a particular discrete time interval when the determination is made, may be used.

Figure 11:
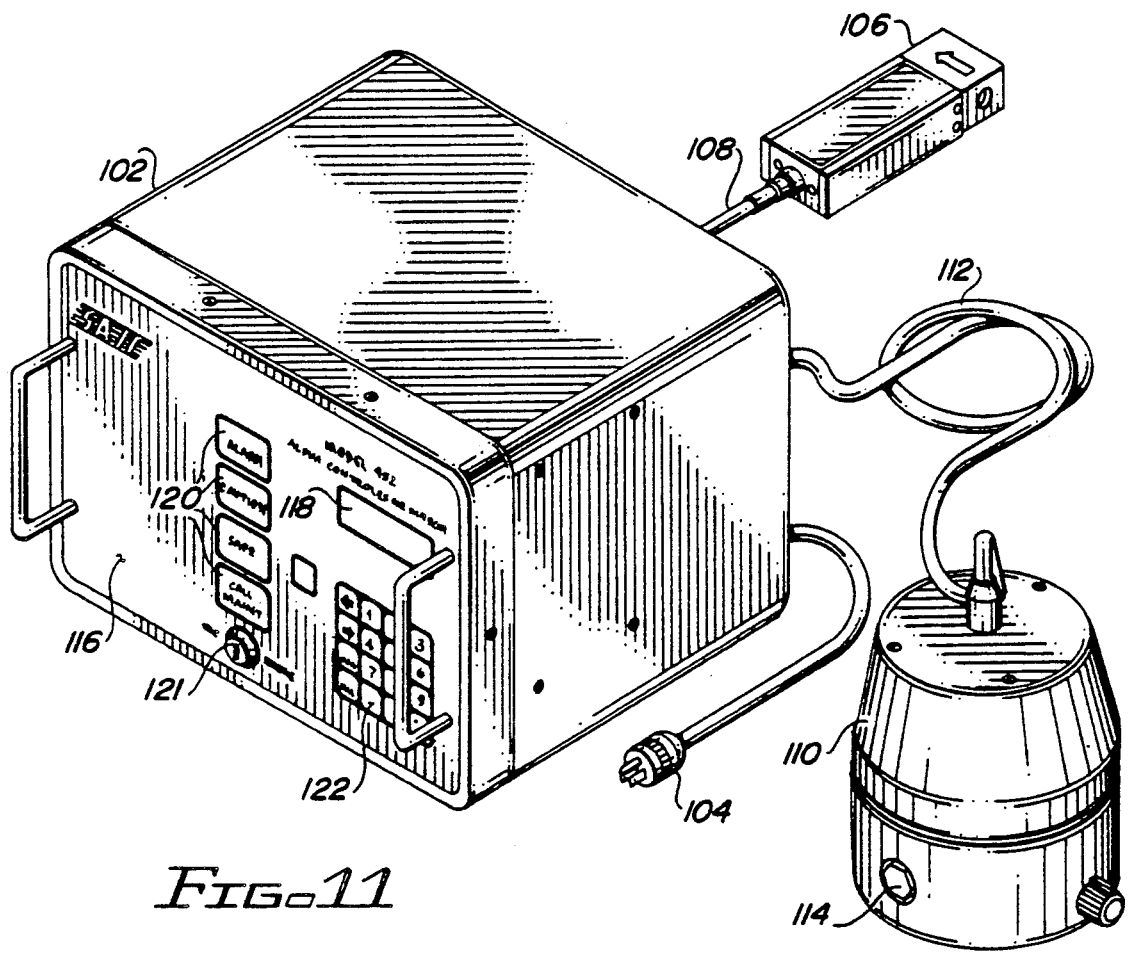
FIG. 11 pictorially illustrates radiation measurement apparatus for continuously measuring alpha radiation in air in accordance with the present invention.

Referring next to FIG. 11, a pictorial diagram of an air monitoring apparatus or system 100 for carrying out the method of the present invention is illustrated. The system 100 includes a chassis assembly 102 powered through an AC power cable 104. A mass flowmeter 106 is coupled to the chassis assembly 102 via a mass flowmeter cable 108. A sample head assembly 110 is also coupled to the chassis assembly 102 by way of a sample head cable 112. The sample head assembly 110 includes a vacuum port 114 to which a suitable vacuum source may be connected. Attachment of a vacuum source to the port 114 removes air from sample head assembly so that a filter card inserted therein can be analyzed for the presence of radioactive components. The mass flowmeter 106 draws a controlled amount of air through a filter placed on a filter card. After a prescribed time, the filter card is inserted into the sample head assembly 110 for analysis. Any alpha particles present in the air sample (the air passed through the filter card) are detected by the detection circuitry included in the head assembly 110. These alpha particles are counted and processed by the circuitry within the chassis assembly 102.

It is noted that while the mass flowmeter 106 and the head assembly 110 are shown as separate devices coupled to the chassis assembly 102, it is to be understood that the two devices may be incorporated into a single device, i.e., a mass flowmeter/head assembly.

The chassis assembly includes a control panel 116 that contains various controls and indicators used in operating the air monitoring system. A digital display 118 displays the net alpha count, $N_A$, or other desired parameters. Various visual indicators 120 indicate the status of the monitoring. As shown, one indicator provides a visual indication of an ALARM condition, i.e., a condition where the net alpha count exceeds a preset threshold. Another indicator indicates a CAUTION condition, signifying the preset threshold has not been exceeded, but the calculated alarm threshold is greater than the requested alarm threshold, or that the ratio $S_4$ (Eq. 21) is greater than a preset threshold, indicating overwhelming scattering beyond the means of the invention to correct. Still another indicator shows a SAFE condition, meaning the alpha count is well below the preset threshold. A further indicator shows a CALL MAINT condition, meaning that the system has detected a malfunction that requires maintenance to correct. Additional, non-visual, alarms may also be generated using, e.g., an internal and/or external speaker, and/or relay contact closures.

Also included on the front panel 116 of the chassis assembly 102 is a keypad 122. This keypad provides a convenient means for entering data, e.g., the preset threshold, and programming commands into the system.

Figure 12:
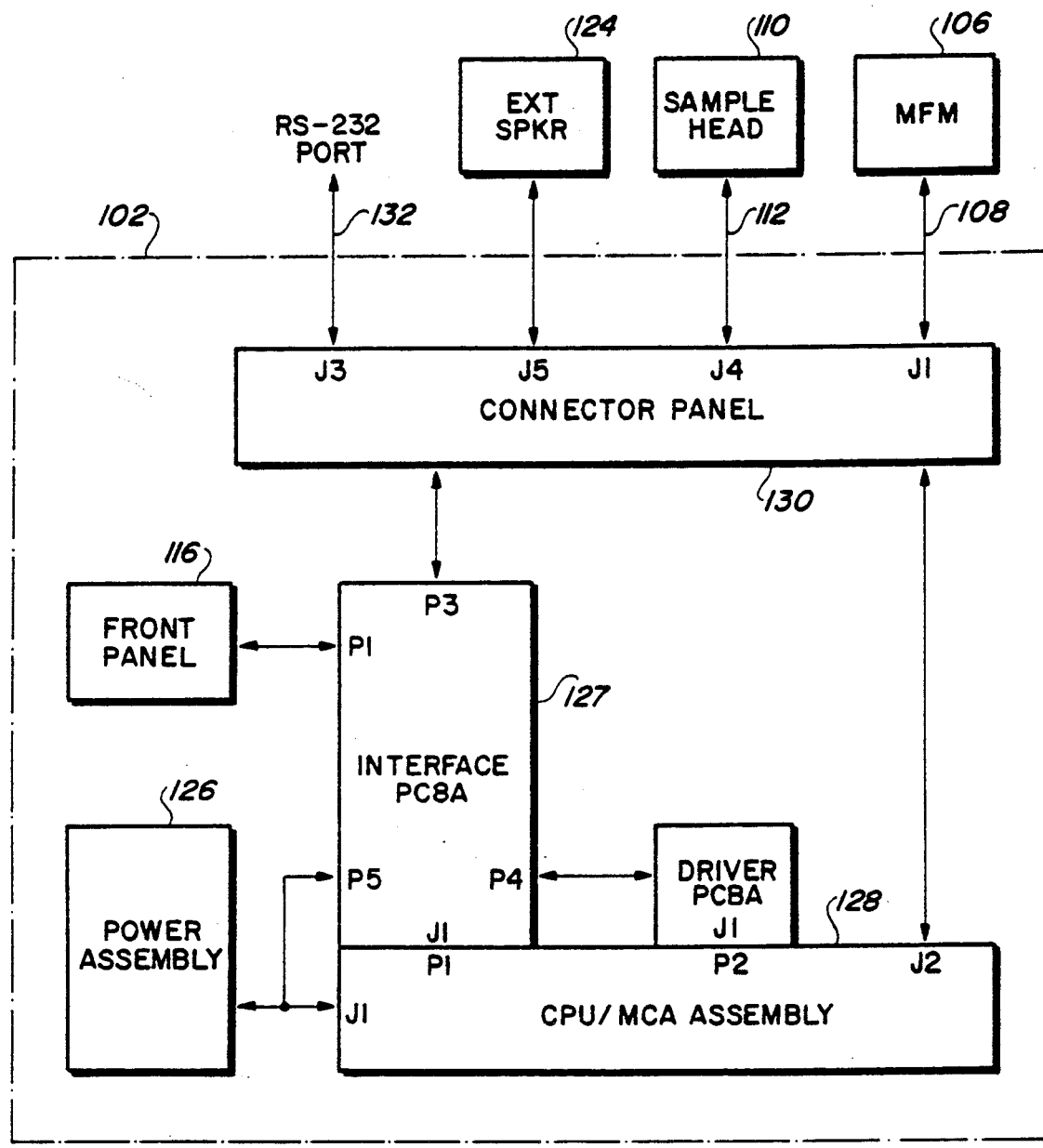
FIG. 12 is a simplified block diagram of the apparatus of FIG. 11.

FIG. 12 shows a simplified block diagram of the continuous air monitoring system 100. As seen in FIG. 12, the chassis assembly includes a power assembly 126, a CPU/MCA assembly 128 (CPU stands for Central Processing Unit; MCA signifies Multi-Channel Analyzer), the front panel 116, and various printed circuit cards (PCBA's) for performing routine interfacing and signal generating functions. Also included is a connector panel 130 for providing connection to the sample head assembly 110, the mass flowmeter 106, and an external speaker 124. The connector panel also includes a RS-232 port 132 for allowing data to be transferred to an external processing unit, either directly or through a modem connected to a telephone line.

Figure 13:
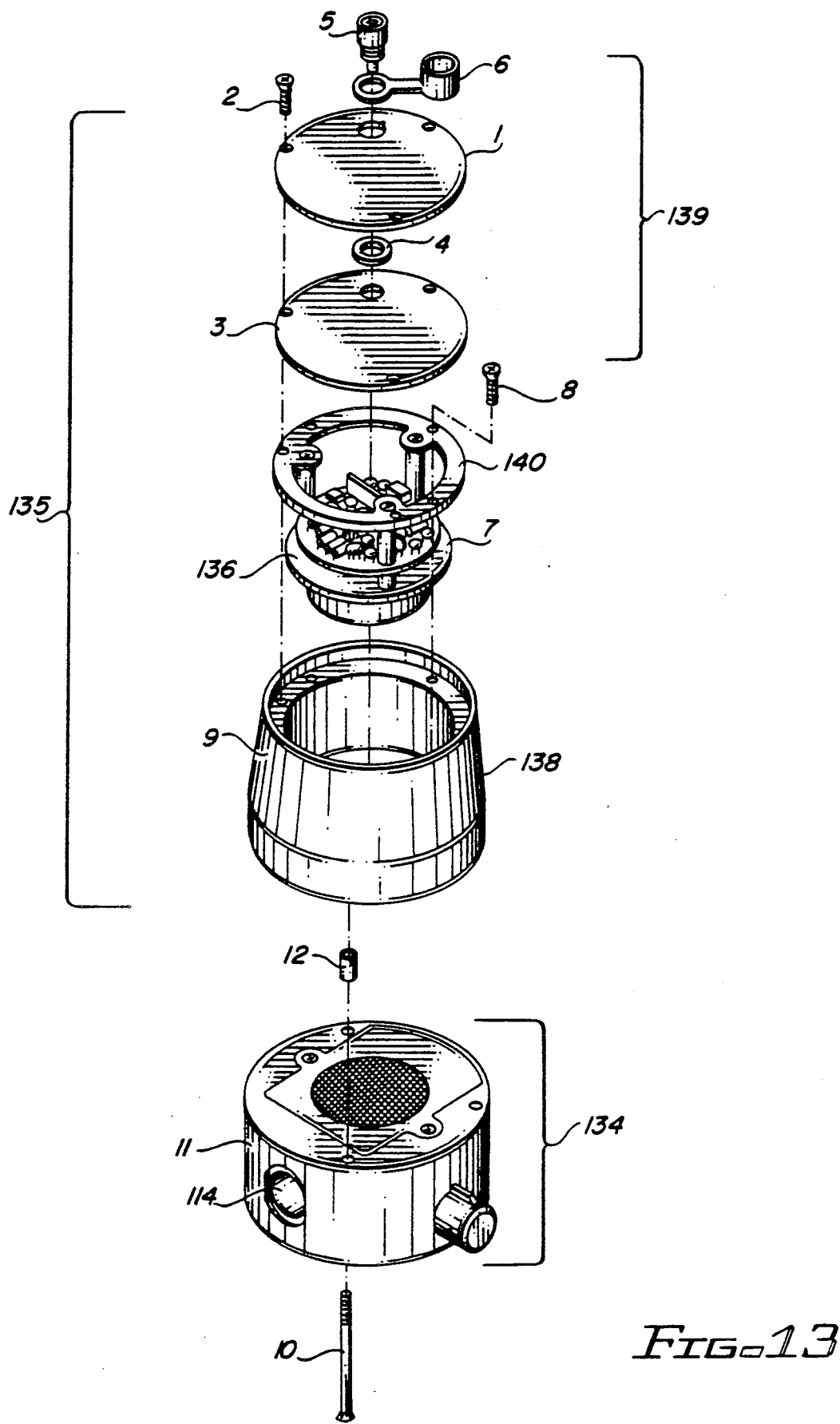
FIG. 13 is an exploded view of a portion of the air sample head assembly of the apparatus of FIG. 11.

Referring next to FIG. 13, an exploded view of the upper portion of the sample head assembly 110 is illustrated. As seen in FIG. 13, the head assembly includes a filter assembly 134 and an alpha detector assembly 135. The alpha detector assembly 135 is positioned above the filter assembly 134. A barrel 138 holds a detector card assembly 136 therein at a prescribed distance above the filter assembly 134. A plate assembly 139 mounts above the detector card 134 to a spacer ring 140 and an upper edge of the barrel 138 to enclose the detector card within the head assembly.

Figure 14A:
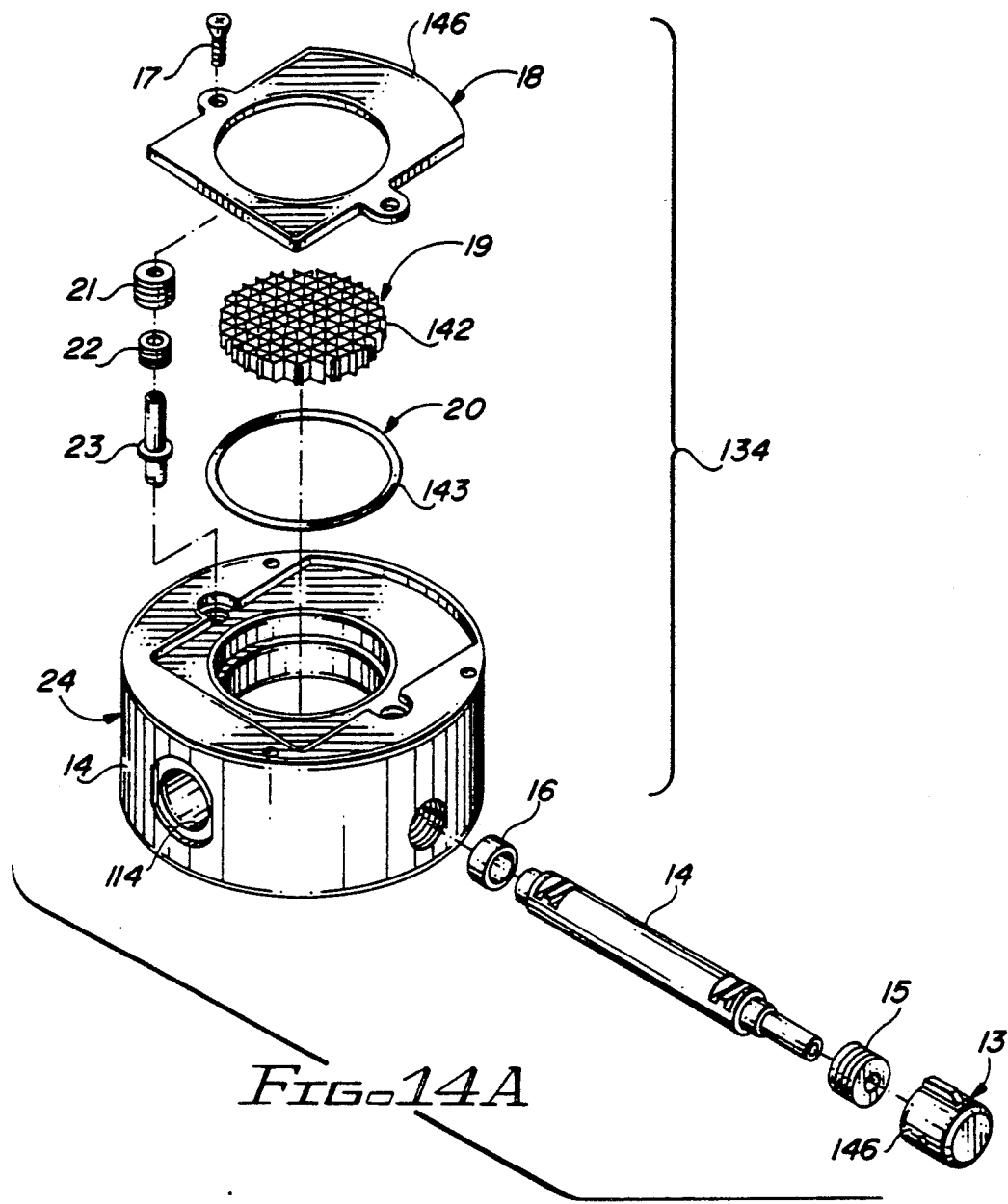
FIG. 14A is a further exploded view of a another portion of the air sample head assembly of the apparatus of FIG. 11.
Figure 14B:
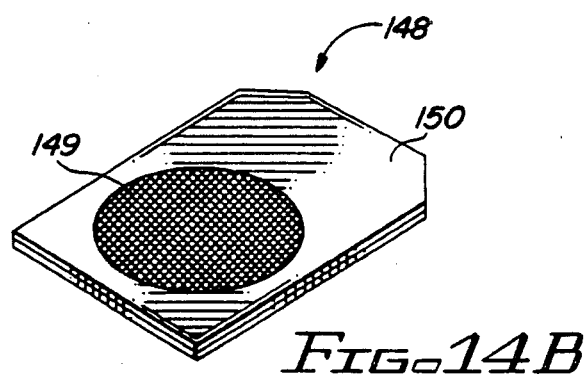
FIG. 14B is a filter card used with the apparatus of FIG. 11.

An exploded view of the filter assembly 134 is shown in FIG. 14A. Essentially, the filter assembly includes a filter screen 142 and an O-ring 143 secured to an annular base 144 with a retaining plate 146. A control knob 146 lifts the retainer plate 146 to allow insertion of a filter card 148 between the retainer plate 146 and the o-ring 143. The filter card 148 is shown in FIG. 14B. The filter card includes filter paper 149 mounted on a card 150. The card 150 facilitates handling, labeling and storage of the filter card.

In use, dust or other particles in the air containing radioactivity are lodged in the filter paper 149 as the air is drawn therethrough. Alpha particles emitted from the lodged dust are detected by the components in the detector card assembly 136 when the filter paper is inserted into the sample head assembly 110.

The detection circuitry included on the detector card assembly 136 includes a detector and amplification circuitry. This circuitry is of conventional design. A description of such circuitry may be found, e.g., in Knoll, Glen F., *Radiation Detection and Measurement* (John Wiley & Sons, 1979). In a preferred embodiment, the surface area of the active detector components is 1700 mm$^2$. The filter element 149 is capable of capturing particles at least 10 as large as 10 microns Mass Median Aerodynamic Diameter (MMAD). The location and mounting of the filter assembly 150 assures an even particle deposition over the entire surface of the filter.

The filter medium is an SM-5 membrane filter with an active area of 1420 mm$^2$, available from Millipore Corporation. The detector to filter distance is approximately 0.2 inches.

In operation, the air monitor operates in three different modes: a normal operation (RUN) mode, a calibration mode, and a maintenance mode. A key lock switch 121 on the control panel 116 provides for selection of the three modes.

In the RUN mode, from 2 to 4 SCFM of air is drawn through a filter card in the sample head to collect alpha-emitting radioactive aerosols such as plutonium-239 and uranium-238. An ion-implanted detector in the sample head detects alpha particles. Signals from the detector are amplified by a preamplifier/amplifier and transmitted to the CPU/MCA assembly 128 within the chassis assembly. The CPU/MCA processes the signals and the results are displayed on the display 118 (preferably an LCD display). Activity levels are shown in units of DAC-hours and counts/second. ("DAC" stands for "Derived Air Concentration", and represents a measure of the concentration of air which, if breathed for a working lifetime, gives a maximum permissible dose.)

The CPU/MCA assembly is of conventional design, based on a Z80 microprocessor chip. The actual microprocessor used is not particularly important, providing it is powerful enough to carry out the computations set forth herein within a reasonable time. Operating programs for the microprocessor are stored in PROM (programmable read only memory), or equivalent. Other forms of program storage could also be used (such as floppy or hard disk) for other processor configurations. Further information relative to the use and programming of such a family of microprocessors may be found in the Z80 CPU Technical Manual, available from ZILOG Corporation.

The air monitor reliably detects less than 8 DAC-hours of plutonium-239 in a background of 1 pCi/l or less, with a false alarm rate of less than once every six months. (The units of "pCi/l" stand for pico-curie per liter.) Three different activity alarms are utilized. Two alarms are preset: a 12-minute running average for maximum sensitivity to a low-level release, and a six-second count for an immediate response to a high-level release. The third alarm may be configured by the user to any desired intermediate level. An interface board assembly 127 (FIG. 12) receives the information processed by the CPU/MCA assembly and provides the required signals needed to energize/deenergize relays or other switches as required in controlling the mass flowmeter 106 the sample head 110, and the various alarms.

Figure 15:
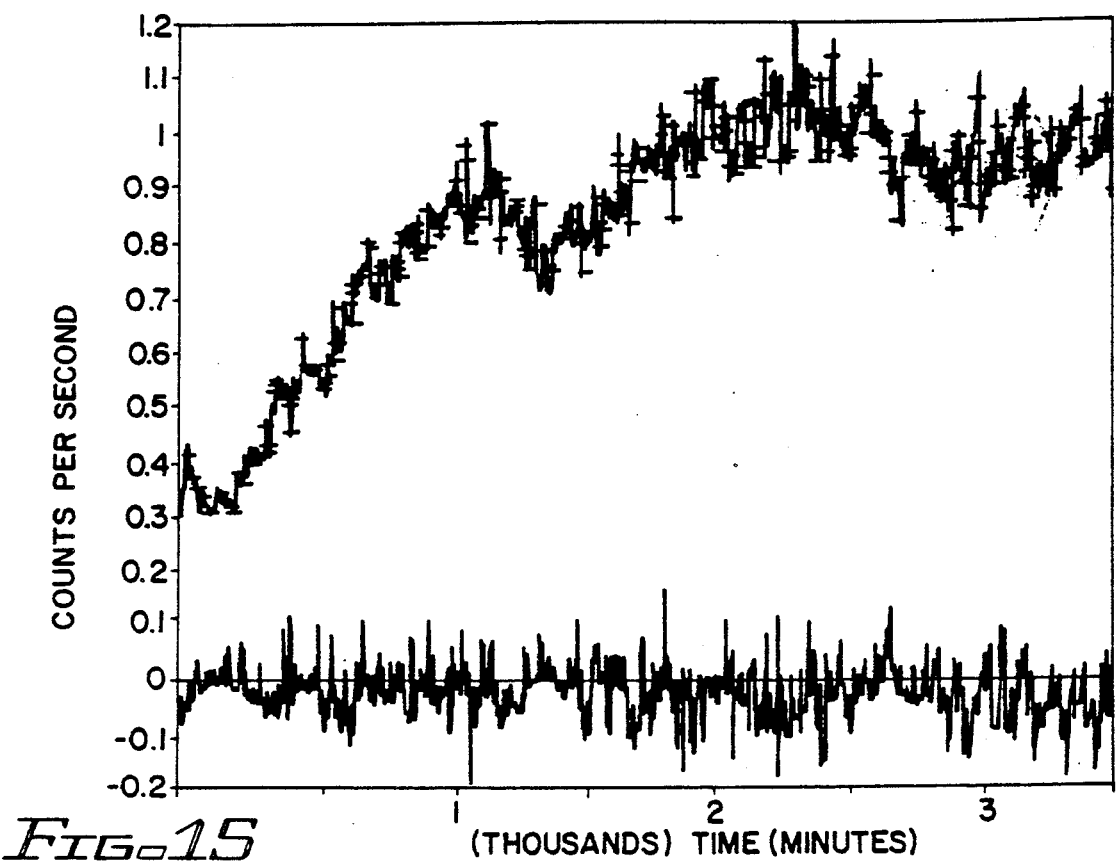
FIG. 15 is a trend plot illustrating measured data obtained with the apparatus of FIG. 11, or equivalent, without using a method to reduce negative bias.

FIG. 15 shows a plot of the background count and the net count for a 63 hour series of natural radioactivity measurements without bias correction, obtained using the measurement apparatus and method as described above. The background decreases below zero during the period from 3200 to 3700 minutes.

Figure 16:
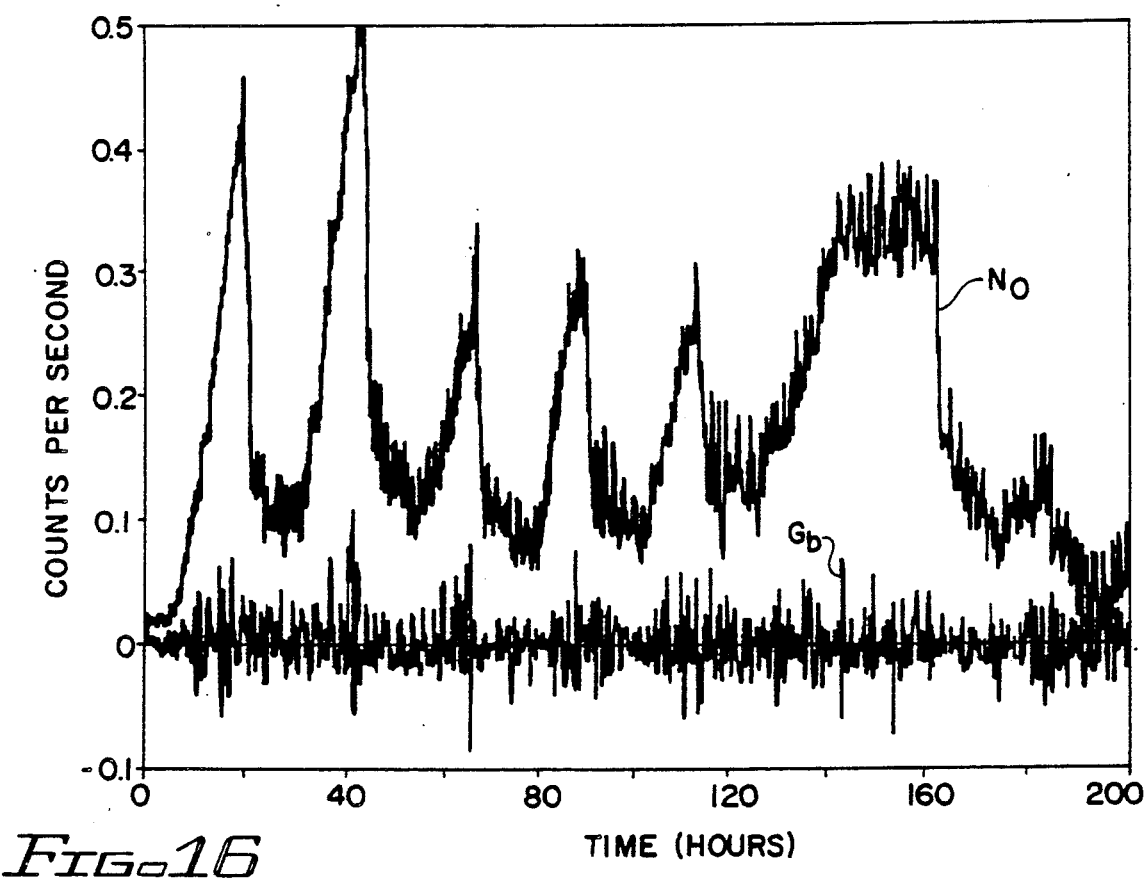
FIG. 16 is a trend plot as in FIG. 15 illustrating measured data obtained using a method to reduce negative bias.

In contrast, FIG. 16 shows the net count for a 140 hour series of natural radioactivity measurements with bias correction. Note that although the fluctuations above and below the zero vary, the average background count remains near zero for the entire period.

While the invention herein disclosed has been described by means of specific embodiments and applications thereof, numerous modifications and variations could be made thereto by those skilled in the art without departing from the scope of the invention set forth in the claims.

What is claimed is:

1. A method of electrically measuring radioactivity of airborne uranium and transuranium elements using electrical signal processing apparatus, said method comprising the steps of:
   (a) spectroscopically detecting emitted alpha particles from a sample of air and electrically counting and categorizing said detected emitted alpha particles to produce an alpha spectrum, said alpha spectrum providing a measure of the relative number of alpha particles within said air sample as a function of alpha particle energy;

(b) electrically dividing said alpha spectrum into n regions, $R_0, R_1, R_2, \ldots R_n$, where n is an integer greater than four, a first region $R_0$ of said n regions corresponding to alpha particles from uranium and transuranium elements, said regions $R_1$ through $R_n$ corresponding to regions having higher energies than said first region;

(c) electrically determining a gross alpha particle count in each of said n regions, each of said gross alpha particle counts comprising the total number of alpha particles having an energy corresponding to one of said n regions at the time of said spectroscopic measurement of step (a);

(d) electrically calculating a first net alpha particle count, $N_0$, for said first region as a function of the gross alpha particle counts determined in step (c) and a set of scattering fractions, said set of scattering fractions providing an indication of how many alpha counts in a given region are attributable to an alpha particle originally having a higher energy than that of said given region, said first net alpha particle count for said first region providing a first measure of the radioactivity of airborne uranium and transuranium elements within said air sample;

(e) electrically defining end regions $R_{-1}$ and $R'_1$ immediately on each side of region $R_0$, said $R_{-1}$ region having a lower energy than region $R_0$, and said $R'_1$ region having a higher energy than region $R_0$; and (f) electrically calculating a second net alpha particle count, $N'_0$, for region $R_0$ as a function of a gross alpha particle count in region $R_{-1}$ and a gross alpha particle count in region $R'_1$, said second net alpha particle count for region $R_0$ providing a second measure of the radioactivity of airborne uranium and transuranium elements within said air sample.

2. The method of measuring radioactivity of airborne uranium and transuranium elements as set forth in claim 1 further including the step of electrically averaging said first and second net alpha particle counts, the resulting average net alpha particle count, $N_A$, providing a third measure of the radioactivity of airborne uranium and transuranium elements within said air sample.

3. The method of measuring radioactivity of airborne uranium and transuranium elements as set froth in claim 2 further including monitoring at least one of said net alpha particle counts, $N_0$, $N'_0$, or $N_A$, at a specified period of time, the setting said at least one net alpha particle count to zero if it has a value less than zero at said specified period of time.

4. The method of measuring radioactivity of airborne uranium and transuranium elements as set forth in claim 2 wherein step (b) includes dividing said alpha spectrum into seven regions, regions $R_0, R_1, R_2, R_3, R_4, R_5$ and $R_6$, where region $R_0$ corresponds to said first region, and includes alpha energies less than region $R_1$, region $R_1$ includes alpha energies less than region $R_2$, region $R_2$ includes alpha energies less than region $R_3$, and so on, with region $R_6$ including the highest alpha energies.

5. The method of measuring radioactivity of airborne uranium and transuranium elements as set forth in claim 4 wherein step (d) comprises solving a set of simultaneous equations set up to describe the scattering from higher alpha energies to lower energies.

6. The method of measuring radioactivity of airborne uranium and transuranium elements as set forth in claim 5 wherein said step (d) comprises solving the following set of simultaneous equations for $N_0$:

$$N_0 = G_0 - F_{20}N_2 - F_{40}N_4 - F_{60}N_6$$

$$N_2 = G_2 - F_{42}N_4 - F_{62}N_6$$

$$N_4 = G_4 - F_{64}N_6$$

$$N_6 = G_6$$

where $N_0$ is said first net alpha particle count,
$N_i$ is the net alpha particle count for the ith region,
$G_i$ is the gross alpha particle count for the ith region,
$F_{i0}$ is the scattering fraction from the ith region to said first region; and
$F_{ij}$ is the scattering fraction from the ith region to the jth region.

7. The method of measuring radioactivity of airborne uranium and transuranium elements as set forth in claim 6 further including adjusting said set of scattering fractions to account for variations in $N_i$.

8. The method of measuring radioactivity of airborne uranium and transuranium elements as set forth in claim 7 wherein adjusting said scattering fractions comprises calculating $F_{ik}$ as $$F_{ik} = AS_i + B$$

where $S_i$ comprises a resolution coefficient for the ith region, and A and B are constants associated with a particular filter type and size used in determining the gross alpha particle count in step (c).

9. The method of measuring radioactivity of airborne uranium and transuranium elements as set forth in claim 8 further including determining said resolution coefficients $S_i$ from the relationships:

$$S_2 = N_1/N_2,$$

$$S_4 = N_3/N_4,$$

$$S_6 = G_5/G_6,$$

where $$N_3 = G_3 - F_{63}G_6,$$

and $$N_1 = G_1 - F_{41}N_4.$$

10. The method of measuring radioactivity of airborne uranium and transuranium elements as set forth in claim 2 wherein step (f) comprises calculating said second net alpha particle count for region $R_0$ from the relationship $$N'_0 = G_0 - G'_b$$

where $N'_0$ is the second net alpha particle count,
$G_0$ is the gross alpha particle count for the region $R_0$, and $G'_b$ is determined from the relationship $$G_b' = \frac{B}{S}(e^{sE4} - e^{sE3})$$

where $$S = \frac{[\ln G_1/(E_6 - E_4) - \ln G_{-1}/(E_3 - E_1)]}{(E_5 - E_2)}$$

and $$B = (G_1/E_6 - E_4)/e^{sE_5};$$

and further where $E_1$ and $E_3$ define the lower and upper energy boundaries of region $R_{-1}$ of the alpha spectrum, respectively; $E_3$ and $E_6$ define the lower and upper energy boundaries of region $R'_1$, respectively, and $E_2$ and $E_5$ define the average energies in regions $R_{-1}$ and $R'_1$, respectively.

11. A method of measuring radioactivity of airborne uranium and transuranium elements using electrical signal processing apparatus, said method comprising the steps of:
    (a) spectroscopically measuring emitted alpha particles from a sample of air at each of a plurality of time sample intervals to produce an alpha spectrum, said alpha spectrum providing a measure of the relative number of alpha particles within said air sample as a function of alpha particle energy at each time sample interval;
    (b) electrically dividing said alpha spectrum for each time sample interval into three regions $R_{-1}$, $R_0$, and $R'_1$, where $R_0$ corresponds to a region of the alpha spectrum o interest, $R_{-1}$ corresponds to a region of the alpha spectrum adjacent the region $R_0$ on one side, and $R'_1$ corresponds to a region of the alpha spectrum adjacent the region $R_0$ on the other side; and
    (c) calculating an average net alpha particle count for region $R_0$ as a function of a gross alpha particle count in region $R_{-1}$ and a gross alpha particle count in region $R'_1$ over a prescribed number of said time sample intervals, and correcting said average net alpha particle count by setting it to zero in the event said average net alpha particle count is less than zero over said prescribed number of time sample intervals, said corrected average net alpha particle count for region $R_0$ providing a measure of the radioactivity of airborne uranium and transuranium elements within said air sample, said calculating and correcting being performed using said electrical signal processing apparatus.

12. The method of measuring radioactivity of airborne uranium and transuranium elements as set forth in claim 11 wherein step (c) includes interpolating between $G_{-1}$ and $G_1$ to determine a value of $G_0$ assuming an exponential increase between $G_{-1}$ and $G_1$, where $G_{-1}$ is the gross alpha particle count for the region $R_{-1}$, $G_0$ is the gross alpha particle count for the region $R_0$, and $G_1$ is the gross alpha particle count for the region $R'_1$.

13. The method of measuring radioactivity of airborne uranium and transuranium elements as set forth in claim 11 wherein step (c) comprises calculating said net alpha particle count for region $R_0$ from the relationship $$N'_0 = G_0 - G'_b$$

where $N'_0$ is the net alpha particle count, and $G_0$ is the gross alpha particle count for the region $R_0$, and $G'_b$ is determined from the relationship $$G_b' = \frac{B}{S}(e^{sE_4} - e^{sE_3})$$

where $$S = \frac{[\ln G_1/(E_6 - E_4) - \ln G_{-1}/(E_3 - E_1)]}{(E_5 - E_2)}$$

and $$B = (G_1/E_6 - E_4)/e^{sE_5};$$

and further where $E_1$ and $E_3$ define the lower and upper energy boundaries of region $R_{-1}$ of the alpha spectrum, respectively; $E_3$ and $E_6$ define the lower and upper energy boundaries of region $R'_1$, respectively, and $E_2$ and $E_5$ define the average energies in regions $R_{-1}$ and $R'_1$, respectively.

14. Apparatus for measuring radioactivity of airborne uranium and transuranium elements comprising:
    means for spectroscopically measuring emitted alpha particles from a sample of air to produce electrical signals representative of an alpha spectrum, said alpha spectrum providing an electrical measure of the relative number of alpha particles within said air sample as a function of alpha particle energy;
    signal processing means for dividing said alpha spectrum into n regions, where n is an integer greater than four, a first region of said n regions corresponding to alpha particles from uranium and transuranium elements;
    electrical counting means within said signal processing means for determining a gross alpha particle count in each of said n regions, each of said gross alpha particle counts comprising the total number of alpha particles having an energy within each of said n regions at the time of the spectroscopic measurement by said spectroscopic measuring means;
    first calculating means within said signal processing means for electrically calculating a first net alpha particle count for said first region as a function of the gross alpha particle counts determined by said counting means and a set of scattering fractions, said set of scattering fractions providing an indication of how many alpha counts in a given region are attributable to an alpha particle originally having a higher energy than that of said given region, said first net alpha particle count for said first region providing a first measure of the radioactivity of airborne uranium and transuranium elements within said air sample;
    means within said signal processing means for further dividing a portion of said alpha spectrum into three regions, an $R_{-1}$ region, an $R_0$ region, and an $R'_1$ region, where $R_0$ corresponds to a region of the alpha spectrum of interest, $R_{-1}$ corresponds to a region of the alpha spectrum adjacent the region $R_0$ on one side, and $R'_1$ corresponds to a region of the alpha spectrum adjacent the region $R_0$ on the other side; and
    second calculating means within said signal processing means for calculating a second net alpha particle count for region $R_0$ as a function of a gross alpha particle count in region $R_{-1}$ and a gross alpha particle count in region $R'_1$, said second net alpha particle count for region $R_0$ providing a second measure of the radioactivity of airborne uranium and transuranium elements within said air sample.

15. Apparatus for measuring radioactivity of airborne uranium and transuranium elements as set forth in claim 14 further including means for averaging said first and second net alpha particle counts and producing an average net alpha particle count that provides a third measure of the radioactivity of airborne uranium and transuranium elements within said air sample.

16. Apparatus for measuring radioactivity of airborne uranium and transuranium elements as set forth in claim 15 further including monitoring means for reducing any negative systematic errors, said reducing means comprising means for monitoring said average net alpha particle count over a specified period of time, and setting any average net alpha particle count having a value less than zero equal to zero during said specified period of time.

17. Monitoring apparatus for continuously monitoring air for the presence of uranium and transuranium elements comprising:
  a chassis assembly containing signal processing means for controlling the operation of said monitoring apparatus;
  a head assembly coupled to said signal processing means, said head assembly including intake means for receiving a sample of air, and detector means for detecting alpha particles present in said sample of air;
  a mass flowmeter coupled to said signal processing means and had assembly for measuring the amount of air flowing therethrough; and
  alarm means for generating a perceptible alarm warning in response to an alarm signal generated by said signal processing means, said alarm signal being generated only when said processing means has determined that the presence of uranium and transuranium elements in said sample of air exceeds a prescribed threshold;
  said signal processing means including:
    means for producing an alpha spectrum indicating the relative number of alpha particles detected by said detector means within said sample of air as a function of alpha particle energy,
    means for dividing said alpha spectrum into n regions, where n is an integer greater than four, a first region of said n regions corresponding to alpha particles from uranium and transuranium elements,
    counting means for determining a gross alpha particle count in each of said n regions, each of said gross alpha particle counts comprising the total number of alpha particles having an energy within each of said n regions at the time of the detection of said alpha particles,
    means for calculating a first net alpha particle count for said first region as a function of the gross alpha particle counts determined by said counting means and a set of scattering fractions, said set of scattering fractions providing an indication of how many alpha counts in a give region are attributable to an alpha particle originally having a higher energy than that of said given region;
    means for dividing a portion of said alpha spectrum into three sections, an $R_{-1}$ section, an $R_0$ section, and an $R'_1$ section, where $R_0$ corresponds to a section of the alpha spectrum of interest, $R_{-1}$ corresponds to a section of the alpha spectrum adjacent the section $R_0$ on one side, and $R'_1$ corresponds to a section of the alpha spectrum adjacent the section $R_0$ on the other side;
    second counting means for determining the gross alpha particle count in each of said $R_{-1}$ and $R'_1$ regions; and
    means for calculating a second net alpha particle count for section $R_0$ as a function of the gross alpha particle count in section $R_{-1}$ and the gross alpha particle count in section $R'_1$;
  said first net alpha particle count for said first region providing a first measure of the radioactivity of airborne uranium and transuranium elements within said sample of air; and
  said second net alpha particle count for section $R_0$ providing a second measure of the radioactivity of airborne uranium and transuranium elements within said sample of air.

18. The monitoring apparatus as set forth in claim 17 wherein said processing means further includes:
  means for averaging said first and second net alpha particle counts and producing an average net alpha particle count that provides a third measure of the radioactivity of airborne uranium and transuranium elements within said air sample;
  means for generating said alarm signal in response to a determination that said average net alpha particle count exceeds a prescribed threshold of alpha particle counts.

19. The monitoring apparatus as set forth in claim 18 wherein said processing means further includes means for monitoring said average net alpha particle count over a specified period of time, and setting any average net alpha particle count having a value less than zero equal to zero during said specified period of time, thereby reducing any negative systematic errors that might otherwise be present in said average net alpha particle count.

20. The monitoring apparatus as set forth in claim 19 wherein said alarm means includes means for generating an audible alarm in response to said alarm signal.

21. The monitoring apparatus as set forth in claim 19 wherein said chassis assembly includes a control panel having manual controls positioned thereon, said manual controls being coupled to said processing means, said processing means including means responsive to said manual controls for adjusting said prescribed threshold of alpha particle counts.

* * * * *

UNITED STATES PATENT AND TRADEMARK OFFICE
CERTIFICATE OF CORRECTION

PATENT NO. : 5,124,936

DATED : June 23, 1992

INVENTOR(S) : Pelletier, et al.

Page 1 of 2

It is certified that error appears in the above-identified patent and that said Letters Patent is hereby corrected as shown below:

IN THE FIGURES: In the drawings, label FIGS. 1-6 as --prior art--. In FIG. 14A, change the reference numeral of the "control knob" from "146" to --147--; change the annular base reference number from "14" to --144--; and delete reference numerals 18, 19, 20 and 24. IN THE SPECIFICATION: Column 2, line 9, after the first occurrence of "the" insert --bend--. Column 3, line 32, change "tworegion" to --two-region--. Column 7, line 27, change "are" to --is--. Column 7, line 28, change "provide" to --provides--. Column 8, line 58, change "exceed" to --exceeds--. Column 9, line 22, delete the second occurrence of "a". Column 9, line 54, change the first occurrence of "of" to --on--. Column 10, line 32 (Equation 6) change "$N_0 \pm S \pm e_b - (G_0 \pm S_0) - (G_0 0 = S_b \pm E_b)$" to --$N_0 \pm S \pm e_b = (G_0 \pm S_0) - (G_0 = S_b \pm E_b)$--. Column 11, line 1, change "Ne" to --$N_0$--. Column 11, line 2, change "$g_o$" to --$g_0$--. Column 12, line 62, (Equation 22) change "$G/G_6$" to --$G_5/G_6$--. Column 12, line 52, after "obtained" insert --.--. Column 13, line 13 change "o" to --to--. Column 13, line 40, change "$E_3$" to --$E_6$--. Column 13, line 60 (Equation 29) delete "i". Column 14, line 26, change "and R," to --and $R_6$,--. Column 17, line 31, change "control knob 146" to --control knob 147--. Column 17, line 33, change "o-ring" to --O-ring--. Column 17, line 52, delete the first occurrence of "10". Column 18, line 38, after "106" insert --,--. Column 19, line 47 (Claim 3) change "froth" to --forth--. Column 21, line 29 (Claim 11) change "o" to --of--. Column 23, line 31, change "had" to --hand--.

UNITED STATES PATENT AND TRADEMARK OFFICE
CERTIFICATE OF CORRECTION

PATENT NO. : 5,124,936

DATED : June 23. 1992

INVENTOR(S) : Pelletier, et al.

It is certified that error appears in the above-indentified patent and that said Letters Patent is hereby corrected as shown below:

Column 24, line 2, (claim 17), change "give" to --given--.

Signed and Sealed this

Nineteenth Day of October, 1993

Attest:

BRUCE LEHMAN

*Attesting Officer*     *Commissioner of Patents and Trademarks*